(12) United States Patent  (10) Patent No.: US 7,565,186 B2
Okuzako et al.  (45) Date of Patent: *Jul. 21, 2009

(54) PORTABLE INFORMATION PROCESSING APPARATUS

(75) Inventors: Kazutaka Okuzako, Higashihiroshima (JP); Masatake Nakano, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/021,028

(22) Filed: Jan. 28, 2008

(65) Prior Publication Data

US 2008/0220821 A1 Sep. 11, 2008

Related U.S. Application Data

(62) Division of application No. 10/631,844, filed on Aug. 1, 2003, now Pat. No. 7,359,740.

(30) Foreign Application Priority Data

Aug. 2, 2002 (JP) ............................ P2002-226316
Jul. 31, 2003 (JP) ............................ P2003-283627

(51) Int. Cl.
*H04M 1/00* (2006.01)
*H04N 7/14* (2006.01)
*H04B 1/38* (2006.01)

(52) U.S. Cl. ................ 455/575.3; 455/575.1; 455/90.3; 348/14.01; 348/14.02

(58) Field of Classification Search ........................ None
See application file for complete search history.

(56) References Cited

U.S. PATENT DOCUMENTS 6,246,888 B1   6/2001   Tsuchiyama et al.
6,308,084 B1   10/2001  Lonka et al.
6,389,267 B1   5/2002   Imai et al.

(Continued)

FOREIGN PATENT DOCUMENTS

CN   1213259 A   4/1999

(Continued)

OTHER PUBLICATIONS

NTT DoCoMo Group, "Instruction Manual" 1st Edition Jun. 2003, pp. 176-179.

(Continued)

*Primary Examiner*—Vincent P. Harper
*Assistant Examiner*—Mazda Sabouri
(74) *Attorney, Agent, or Firm*—Birch, Stewart, Kolasch & Birch, LLP

(57) ABSTRACT

An outer display is provided in an area exposed to the outside, of a first movable part in a closed condition where the first and second movable parts are opposed to each other. An outer operation section is provided in an area other than the exposed area of the first and second movable parts whichever comes behind the outer display in a closed condition where the first and second movable parts are opposed to each other. The operator can enter predetermined information on a predetermined display content displayed on the outer display. Even in a condition where the first and second movable parts fold closed, the operator can enter predetermined information from the outer operation section while watching the outer display, which enhances the operability.

48 Claims, 24 Drawing Sheets

U.S. PATENT DOCUMENTS

| | | |
|---|---|---|
| 6,445,932 B1 | 9/2002 | Soini et al. |
| 6,957,083 B2 | 10/2005 | Ikeda et al. |
| 2001/0044319 A1 | 11/2001 | Kobayashi |
| 2002/0042853 A1 | 4/2002 | Santoh et al. |
| 2002/0142810 A1 | 10/2002 | Kawasaki et al. |
| 2002/0147033 A1 | 10/2002 | Ban et al. |
| 2002/0177464 A1 | 11/2002 | Swerup et al. |
| 2003/0186708 A1 | 10/2003 | Parulski et al. |
| 2004/0077386 A1* | 4/2004 | Nagasawa ................ 455/575.1 |
| 2004/0166829 A1 | 8/2004 | Nakae et al. |

FOREIGN PATENT DOCUMENTS

| | | |
|---|---|---|
| CN | 1238629 A | 12/1999 |
| EP | 0897236 A2 | 2/1999 |
| EP | 0963100 A1 | 12/1999 |
| GB | 2358318 A | 7/2001 |
| GB | 2358758 A | 8/2001 |
| JP | 3-74031 U | 7/1991 |
| JP | 04-176240 A | 6/1992 |
| JP | 10-79212 A | 3/1998 |
| JP | 11-265254 A | 9/1999 |
| JP | 2001-136248 A | 5/2001 |
| JP | 2001-298514 A | 10/2001 |
| JP | 2001-326710 | 11/2001 |
| JP | 2002-111834 A | 4/2002 |
| JP | 2002-111835 A | 4/2002 |
| JP | 2002-118644 A | 4/2002 |
| JP | 2002-141993 A | 5/2002 |
| JP | 2002-182783 | 6/2002 |
| KR | 2000-0011205 U | 6/2000 |
| WO | WO-01/31893 A1 | 5/2001 |

OTHER PUBLICATIONS

JP 2004-075253, Notification of Reason for Refusal, Japanese Office Action mailed Jan. 5, 2005.

JP 2004-075254, Notification of Reason for Refusal, Japanese Office Action mailed Jan. 5, 2005.

JP 2004-075255, Notification of Reason for Refusal, Japanese Office Action mailed Jan. 5, 2005.

Instructions Manual, MOVA SH25li, Functional Description Section, 3rd edition, NTT DoCoMo Group, Jul. 2002, pp. 140-163, and partial English translation.

Database WPI; Section EI, Week 200161; Derwent Publications Ltd., London, GB; AN 2001-548627 XP002263721 & KR 2001-028 989 A (Samsung Electronics Co. Ltd), Apr. 6, 2001; Abstract.

* cited by examiner

PORTABLE INFORMATION PROCESSING APPARATUS

CROSS REFERENCE TO RELATED APPLICATIONS

This application is a Divisional of application Ser. No. 10/631,844, filed on Aug. 1, 2003, now U.S. Pat. No. 7,359,740 and for which priority is claimed under 35 U.S.C. Section 35 U.S.C. § 120, which claims priority of Application No(s). 2002-226316 and 2003-283627 filed in JAPAN on Aug. 2, 2002 and Jul. 31, 2003 respectively under 35 U.S.C § 119; the entire contents of all are hereby incorporated by reference.

BACKGROUND OF THE INVENTION

1. Field of the Invention

The present invention relates to a folding portable information processing apparatus and a portable information processing apparatus having a display on each of the inner surface and the outer surface in a folded condition thereof.

2. Description of the Related Art

There is known a cellular telephone comprising a folding body, a first liquid crystal display and a second liquid crystal display, which first liquid crystal display is arranged on an inner surface of the folding body in a closed condition thereof and which second liquid crystal display is arranged in a location where information can be checked without opening the body. On such a cellular telephone, the body is opened to enter predetermined information from the operation section (for example, refer to Japanese Unexamined Patent Publication JP-A 2002-141993 (2002)).

FIG. 29 is a perspective view of another cellular telephone 1 viewed from one side as a related art portable information processing apparatus. FIG. 30 is a perspective view of the cellular telephone 1 viewed from the other side. FIG. 29 shows the cellular telephone 1 in an open condition of the body thereof. FIG. 30 shows the cellular telephone 1 in a closed condition of the body thereof.

The cellular telephone 1 comprises a first movable part 2 and a second movable part 3 connected movably in relative angular displacement by a hinge 4, from a closed condition where the movable parts are opposed to each other to an open condition where the areas opposed in the closed condition are exposed to the outside. In a closed condition where the first and second movable parts 2, 3 are opposed to each other, an operation section 5 for entering predetermined information is provided in an area of the second movable part 3 opposed to the first movable part 2, and an inner display 6 is provided in an area of the first movable part 2 opposed to the second movable part 3.

An outer display 7 is provided in an exposed area of the first movable part 2 and behind the inner display 6 when the cellular telephone 1 is viewed from the inner display 6 in a closed condition where the first and second movable parts 2, 3 opposed to each other. On the first movable part 2 is provided an imaging section 8 on the same side as the side where the display face of the outer display 7 faces.

The cellular telephone 1 can display a predetermined display content, for example an image shot with the imaging section 8, at least on one of the inner display and the outer display in response to predetermined information entered from the operation section 5.

On the side of the first movable part 2 is provided a shutter button 9. The cellular telephone 1 has a memory in its interior. When the operator presses the shutter button 9, an image shot with the imaging section 8 is stored into the memory.

According to the portable information processing apparatus, it is impossible to operate the operation section with the enclosure of the portable information processing apparatus folded, so that a predetermined display content desired by the operator cannot be displayed on the second liquid crystal display.

On the related art cellular telephone 1, only the shutter button 9 is provided in the area exposed to the outside in a closed condition where the first and second movable parts 2, 3 are opposed to each other. In the condition where the first and second movable parts 2, 3 are opposed to each other, the operation section 5 is covered by the first movable part 2 and not exposed to the outside. Thus the operator cannot enter predetermined information from the operation section 5. As a result, like the portable information processing apparatus, a predetermined display content desired by the operator cannot be displayed on the outer display 7.

To display a predetermined display content desired by the operator on the outer display 7, it is necessary to unfold the first and second movable parts 2, 3 and enter from the operation section 5 predetermined information on the predetermined display content to be displayed on the outer display 7. The operation section 5 is provided facing the side opposite to the outer display 7 with the first and second movable parts 2, 3 in an open condition. Thus it is difficult for the operator to enter predetermine information from the operation section 5 while watching the outer display 7. Even in case a predetermined display content is displayed on the outer display 7, it is necessary to face the operation section 5 toward the operator. On the cellular telephone 1, in order to display a predetermined display content on the outer display 7, it is necessary to unfold the first and second movable parts 2, 3 and enter predetermined information on the predetermined display content with the operation section 5 facing the operator, resulting in cumbersome operation. In case a predetermined information is entered with the operation section 5 facing the operator, the operator cannot watch the outer display 7 where the predetermined display content is provided. It is thus necessary to flip over the cellular telephone 1 in order to check the display content on the outer display 7. This often results in a longer set time for displaying the display content desired by the operator on the outer display 7.

For example, in case it is necessary to enter predetermined information on an image as a display content to be displayed on the outer display 7 in setting various functions during photographing such as exposure correction setting, ZOOM/WIDE setting, image size setting and image quality selection while an image shot with the imaging section 8 is displayed on the outer display 7 and the outer display 7 is used as a camera finder, the operator must enter information on the operation section 5 facing the side opposite to the outer display 7 and has difficulty in entering predetermined information while watching the outer display 7. Thus, the operator must flip over the cellular telephone 1 and has difficulty in entering in entering predetermined information while watching the outer display 7, which worsens operation of the apparatus.

SUMMARY OF THE INVENTION

An object of the invention is to provide portable information processing apparatus featuring enhanced operability which is capable of readily displaying a predetermined display content on a display provided in an area exposed to the outside in a condition where a first movable part and a second movable part fold closed while opposed to each other.

The invention provides a portable information processing apparatus comprising:

a first movable part;

a second movable part, the first movable part and the second movable part being connected so as to be mutually angularly displaceable, from a closed condition where the movable parts are opposed to each other to an open condition where areas of the first and second movable parts opposed in the closed condition are exposed to the outside;

an inner operation section for entering predetermined information, the inner operation section being provided in an area of the second movable part opposed to the first movable part in a closed condition where the first and second movable parts are opposed to each other;

an inner display for displaying a predetermined display content in response to predetermined information entered from the inner operation section, the inner display being provided in an area of the first movable part opposed to the second movable part in a closed condition where the first and second movable parts are opposed to each other;

an outer display for displaying a predetermined display content, the outer display being provided in an area exposed to the outside, of at least one of the first movable part and second movable part in a closed condition where the first and second movable parts are opposed to each other; and an outer operation section for entering predetermined information on the predetermined display content displayed on the outer display, the outer operation section being provided in an area other than the exposed area of at least one of the first and second movable parts whichever comes behind the outer display in a closed condition where the first and second movable parts are opposed to each other.

According to the invention, even in a closed condition where the first and second movable parts are opposed to each other, the outer operation section for entering predetermined information on the predetermined display content displayed on the outer display provided in the exposed area of the first and second movable parts. Thus it is possible to enter predetermined information from the outer operation section to display a predetermined display content on the outer display without placing the portable information processing apparatus in an open condition where the areas opposed when the first and second movable parts fold closed are exposed to the outside.

The outer operation section is provided in an area other than the exposed area of at least one of the first and second movable parts whichever comes behind the outer display in a closed condition where the first and second movable parts are opposed to each other. Thus the outer operation section is arranged in an area where the operator can perform operation while watching the outer display. The operator can enter predetermined information from the outer operation section while watching the outer display so that it is possible to display a display content desired by the operator on the outer display.

According to the invention, even in a condition where the first and second movable parts fold closed while opposed to each other, it is possible to enter predetermined information from the outer operation section and display a predetermined display content on the outer display provided in an area exposed to the outside in a condition where the first and second movable parts fold closed.

The outer operation section is arranged in an area where the operator can perform operation while watching the outer display. The operator can enter predetermined information with ease from the outer operation section while watching the outer display, thus the operator can enter predetermined information from the outer operation section while watching a predetermined display content displayed on the outer display. This enhances the operability and displays a display content desired by the operator on the outer display in a brief interval of time.

According to the invention, the operator can enter predetermined information from the outer operation section while watching the outer display even in a condition where the first and second movable parts fold closed and readily display a predetermined display content desired by the operator on the outer display, thereby enhancing the convenience.

In the invention it is preferable that the portable information processing apparatus further comprises an imaging section disposed on the exposed area, for shooting an image in response to predetermined information entered from one of the inner operation section and the outer operation section, the imaging section being provided facing the same side as the side where the display face of the outer display faces, and that an image shot with the imaging section is displayed on at lease one of the inner display and the outer display corresponding to one of the inner operation section and the outer operation section from which the predetermined information used to shoot an image with the imaging section was entered.

According to the invention, the imaging section shoots an image in response to predetermined information entered from one of the inner operation section and the outer operation section. In case predetermined information is entered from the inner operation section for shooting with the imaging section, an image shot with the imaging section is displayed at least on the inner display corresponding to the inner operation section. In case predetermined information is entered from the outer operation section for shooting with the imaging section, an image shot with the imaging section is displayed at least on the outer display corresponding to the outer operation section.

The imaging section is provided facing the same side as the side where the display face of the outer display faces. Thus, even in case the operator takes a picture of the operator himself/herself, he/she can take a picture while checking the range of photographing by the imaging section by displaying on the outer display an image to be shot with the imaging section. Thereby the freedom of photographing is enhanced.

In the invention it is preferable that the portable information processing apparatus further comprises a condition detector for detecting a closed condition and an open condition of the first and second movable parts, and that wherein the inner operation section is activated and the outer operation section is deactivated in case the first and second movable parts are in an open condition and the inner operation section is deactivated and the outer operation section is activated in case the first and second movable parts are in a closed condition.

According to the invention, the inner operation section is activated and the outer operation section is deactivated in case the first and second movable parts are in an open condition, while the inner operation section is deactivated and the outer operation section is activated in case the first and second movable parts are in a closed condition. It is not necessary to enter, from the inner operation section or outer operation section, predetermined information for determining which of the inner operation section or outer operation section is used to enter information. It is possible to readily choose the inner operation section or outer operation section from which information is entered, by simply moving the first and second movable parts in relative angular displacement to place the first and second movable parts in a closed condition or open condition.

When the first and second movable parts are placed in an open condition in order to enter predetermined information from the inner operation section, only input from the inner operation section is valid so that input operation is avoided even when the outer operation section undesirably comes in contact with another object thus preventing malfunction. When the first and second movable parts are placed in a closed condition in order to enter predetermined information from the outer operation section, only input from the outer operation section is valid. It is thus possible to enter predetermined information from the outer operation section without choosing one of the inner operation section and the outer operation section.

According to the invention, it is possible to readily determine which of the inner operation section or outer operation section is used to enter information only by moving the first and second movable parts in relative angular displacement to place the first and second movable parts in a closed condition or open condition. Thus it is not necessary to operate the inner operation section or outer operation section to choose the target operation section thus enhancing the operability.

When the first and second movable parts are placed in an open condition, only input from the inner operation section is valid. When the first and second movable parts are placed in a closed condition, only input from the outer operation section is valid. This operation is invalid even in case, during operation in one operation section, any finger of the operator undesirably comes in contact with the other operation section, thus preventing malfunction.

In the invention it is preferable that at least one of the inner operation section and the outer operation section includes an operation selector for activating one of the inner operation section and the outer operation section and deactivating the other one of the inner operation section and the outer operation section.

According to the invention, it is possible to activate one of the inner operation section and the outer operation section and deactivate the other one of the inner operation section and the outer operation section by way of the operation selector included by at least one of the inner operation section and the outer operation section. Thus it is possible to readily choose the operation section from which predetermined information is entered. Further, by activating only one of the inner operation section and the outer operation section, it is possible to prevent the other one of the inner operation section and the outer operation section from coming in contact with another object and triggering malfunction.

In the invention it is preferable that the condition detector comprises:

a discrete contact section where one set of discrete contacts and another set of discrete contacts formed in the shape of comb teeth are formed in engagement while spaced from each other in a substrate face direction; and a common contact section for mutually providing electric connection between the discrete contacts in a closed condition where the first and second movable parts are opposed to each other or in an open condition where the areas opposed in the closed condition are exposed to the outside.

According to the invention, in a closed condition where the first and second movable parts are opposed to each other or in an open condition where the areas opposed in a closed condition are exposed to the outside, to the discrete contact section where one set of discrete contacts and the other set of discrete contacts formed in the shape of comb teeth are formed in engagement while spaced from each other in the direction of the face of a substrate is connected the common contact section which mutually provides electric contact with each of the discrete contacts. It is thus readily possible to detect, by way of the open/closed condition of the contact section, whether the first and second movable part are in a closed condition or open condition.

The common contact section comes in contact with a plurality of tongues of one or the other sets of discrete contacts having a shape of comb teeth. Even in case some of the plurality of tongues do not come into contact with the common contact section, the other tongues remain in contact with the common contact section. This secures connection between one and the other sets of discrete contacts. Even in an imperfect contact, it is possible to detect the closed condition and the open condition of the first and second movable parts without fail.

According to the invention, whether the first and second movable parts are in a closed condition or an open condition is detected by way of open/closed condition of the contact section. The closed condition and the open condition are detected by way of the physical contact. It is thus possible to fabricate a condition detector by using a simple configuration as well as to perform reliable detection.

The common contact section connects to the plurality of tongues of one and the other sets of discrete contacts having a shape of comb teeth. This secures detection of the closed condition and the open condition of the first and second movable parts even in an imperfect contact condition, thus preventing malfunction of the apparatus.

In the invention it is preferable that the portable information processing apparatus further comprises:

an externally oriented imaging section provided in the exposed area; and a controller for causing the imaging section to shoot an image in response to predetermined information entered from one of the inner operation section and the outer operation section and displaying the image shot by the imaging section on at least one of the inner display and the outer display corresponding to one of the inner operation section and the outer operation section from which the predetermined information was entered.

According to the invention, the imaging section shoots an image in response to the predetermined information entered from one of the inner operation section and the outer operation section. The imaging section is provided while externally oriented in the area exposed when the first and second movable parts are in a closed condition. Thus it is possible to shoot a desired image even in a closed condition.

According to the invention, by associating the inner operation section to the inner display and the outer operation section to the outer display, it is possible to enter predetermined information from the inner operation section or outer operation section while watching the inner display or outer display and checking the image shot with the imaging section. Thus, it is possible to enter predetermined information on the setting of the imaging section such as exposure correction setting, ZOOM/WIDE setting, image size setting and image quality selection while watching the display, thereby enhancing the operability of the apparatus.

In the invention it is preferable that the controller sets the outer operation section to a command input function capable of inputting a command related to photographing, while displaying the image shot by the imaging section on the outer display.

According to the invention, the controller sets the outer operation section to a command input function capable of inputting a command related to photographing, such as a command to modify the magnification of photographing by the imaging section while displaying the image shot by the imaging section on the outer display. This allows the outer operation section to modify the setting on for example photographing while the image shot by the imaging section is being displayed on the outer display, thereby enhancing the convenience.

According to the invention, it is possible to use the outer operation section to modify the setting on photographing, for example setting on the magnification of photographing while the image shot by the imaging section is being displayed on the outer display. Thus, it is not necessary to modify the setting on photographing after changing the display state of the outer display. Setting on photographing is available via simple operation, which enhances the convenience.

In the invention it is preferable that the controller displays a plurality of function display buttons for setting a desired function selected from among a plurality of functions related to photographing on one of the inner display and the outer display, and a plurality of function setting operation buttons corresponding to the plurality of function display buttons are respectively provided in the inner operation section and the outer operation section.

According to the invention, the plurality of function display buttons for setting a function desired by the operator from among the plurality of functions related to photographing are displayed on one of the inner display or the outer display. By operating a function setting operation button in the inner operation section, it is possible to set a function corresponding to the function display button displayed on the inner display. Also, by operating a function setting operation button in the outer operation section, it is possible to set a function corresponding to the function display button displayed on the outer display.

According to the invention, it is possible to use the function setting operation buttons formed by way of hardware such as the inner operation section and the outer operation section to choose function display buttons displayed on the inner display and the outer display and formed by way of software and to set functions corresponding to the function display buttons. This approach reduces the number of function setting operation buttons. Thus the hardware configuration of the apparatus is simplified and the number of parts is reduced to facilitate assembling of the apparatus.

In the invention it is preferable that the controller displays the function setting display buttons on the outer display in a state where settable functions are restricted in comparison with the plurality of function display buttons displayed on the inner display.

According to the invention, the controller may display a limited number of target function display buttons on the outer display. For example, setting of a self-timer duration may be set to a predetermined duration. In this way, it is possible to display a limited level of the settable functions on the outer display.

According to the invention, a plurality of function display buttons on the inner display are used to make detailed setting while a plurality of function display buttons on the outer display are used to make simple setting. This reduces the number of function setting buttons displayed on the outer display compared with the inner display, which facilitates simple setting.

As a result, it is possible to make setting with the portable information processing apparatus closed if detailed setting is not made. It is not necessary to unfold the apparatus in order to make setting, which simplifies the operation procedure and reduces the setting time.

In the invention it is preferable that the portable information processing apparatus comprises a setting information storage section for storing information set with the function setting operation button.

According to the invention, information set with the function setting operation button is stored into the information setting storage section so that the information once set is maintained.

According to the invention, the information once set is maintained thus eliminating the complexity of changing the setting per photographing occasion, thus enhancing the convenience.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
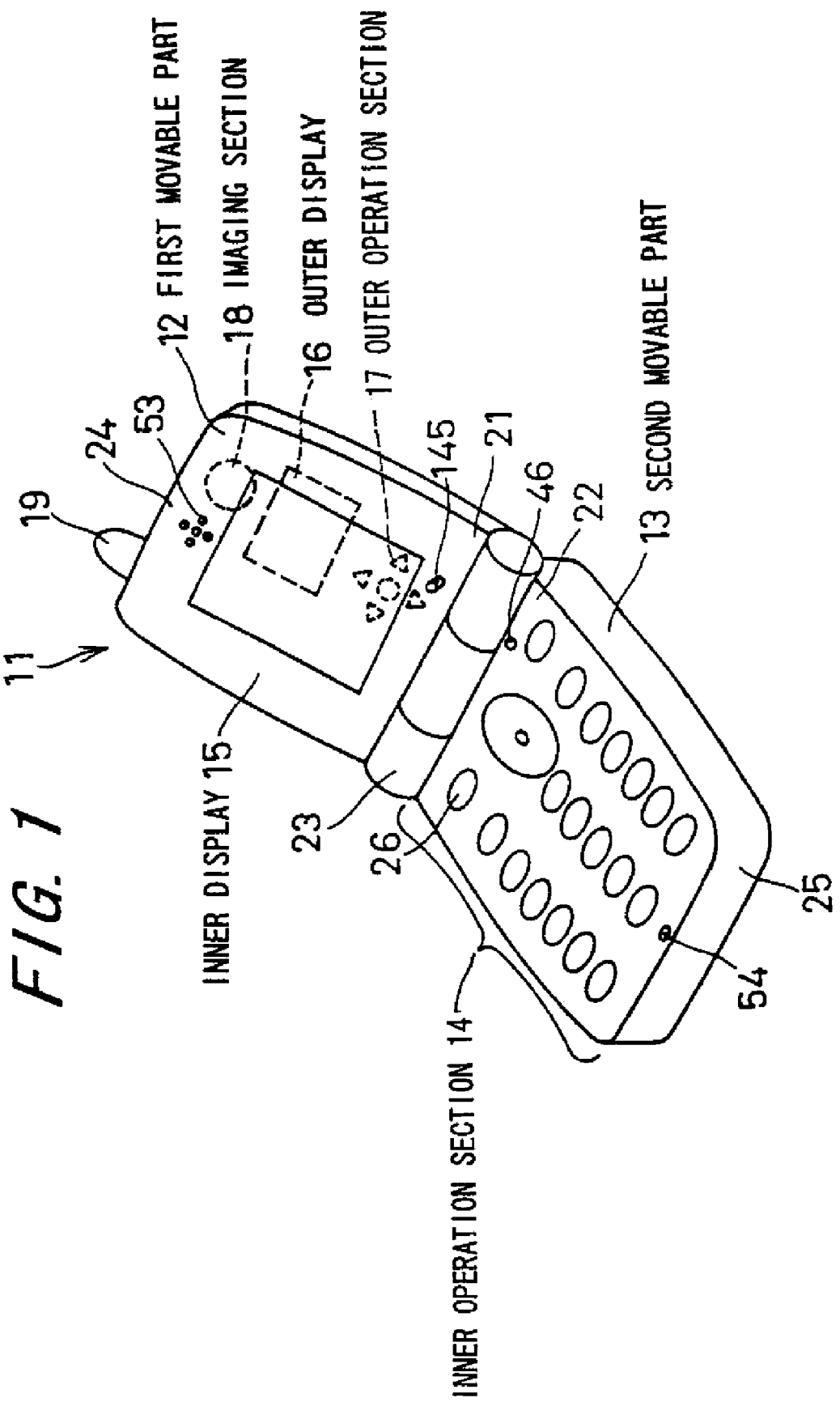
FIG. 1 is a perspective view of portable information processing apparatus according to an embodiment of the invention viewed from one side.

Now referring to the drawings, preferred embodiments of the invention are described below.

Figure 2:
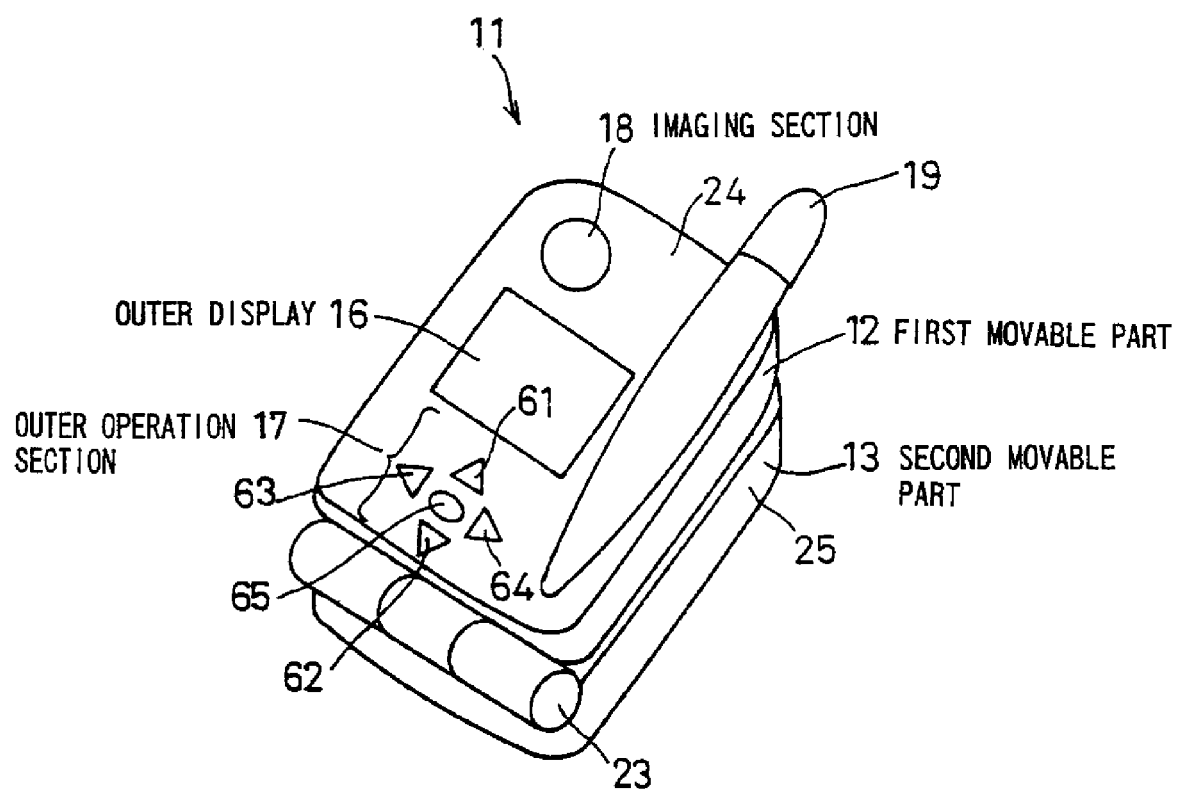
FIG. 2 is a perspective view of the portable information processing apparatus viewed from the other side.

FIG. 1 is a perspective view of portable information processing apparatus 11 according to an embodiment of the invention viewed from one side. FIG. 2 is a perspective view of the portable information processing apparatus 11 viewed from the other side. FIG. 1 shows the portable information processing apparatus 11 in an open condition. FIG. 2 shows the portable information processing apparatus 11 in a closed condition. The portable information processing apparatus 11 according to this embodiment is a communications terminal and in particular a cellular telephone. In the invention, imaging has the same meaning as photographing.

The portable information processing apparatus 11 comprises a first movable part and a second movable part 12, 13 connected movably in relative angular displacement from a closed condition where the movable parts are opposed to each other to an open condition where the areas opposed in the closed condition are exposed to the outside, an inner operation section 14 for entering predetermined information, an inner display 15 for displaying a predetermined display content in response to predetermined information entered from the inner operation section 14, an outer display 16 for displaying a predetermined display content, an outer operation section 17 for entering predetermined information on the predetermined display content displayed on the outer display, an imaging section 18, and an antenna 19.

The first and the second movable parts 12, 13 are approximately formed into a hollow box. The base end 21 of the first movable part 12 and the base end 22 of the second movable part 13 are connected movably in relative angular displacement by a hinge 23. The first and the second movable parts 12, 13 are movable about the hinge 23 in relative angular displacement from a closed condition where the first and the second movable parts 12, 13 are opposed to each other to a position where an angle formed between a virtual plane including the hinge 23 and the free end 24 of the first movable part 12 and a virtual plane including the hinge 23 and the free end 25 of the second movable part 13 reaches approximately 180 degrees.

The inner operation section 14 is a first operation section and is provided in an area of the second movable part 13 opposed to the first movable part 12 in a closed condition where the first and second movable parts 12, 13 are opposed to each other. The inner operation section 14 has a plurality of operation keys for entering predetermined information such as numerical data, text data, and an instruction to the portable information processing apparatus 11. The inner operation section 14 supplies an instruction signal corresponding to each key to a controller 31 mentioned later by way of operation of the operation keys.

To any one of the plurality of operation keys of the inner operation section 14 is assigned an operation selector key 26 for activating one of the inner operation section 14 and the outer operation section 17 and deactivating the other one of the inner operation section 14 and the outer operation section 17.

The inner display 15 is provided in an area of the first movable part 12 opposed to the second movable part 13 in a closed condition where the first and second movable parts 12, 13 are opposed to each other. The inner display 15 is implemented by a translucent half-reflecting liquid crystal display device which enables color display.

By providing the inner display 15 and the inner operation section 14 in the areas of the first and second movable parts 12, 13 opposed to each other, the operator can enter predetermined information from the inner operation section 14 while watching the inner display 15 with the first and second movable parts 12, 13 in an open condition. The open condition in this embodiment refers to a condition where areas opposed to each other in a closed condition with the first and second movable parts 12, 13 opposed to each other are exposed to the outside. In this condition, the operator can watch the inner display 15 and operate the inner operation section 14 at the same time.

The outer display 16 is provided in the exposed area of at least one of the first and second movable parts 12, 13 in a closed condition where the first and second movable parts 12, 13 are opposed to each other. In this embodiment, the outer display 16 is provided in an area exposed to the outside, of the first movable part 12 and behind the inner display 15 when the first movable part 12 is viewed from the inner display 15. Thus the display face of the inner display 15 and the display face of the outer display 16 moves in departing directions from each other, The outer display 16 is implemented by a translucent half-reflecting liquid crystal display device which enables color display.

While the inner display 15 and the outer display 16 may be implemented by any one of a translucent half-reflecting liquid crystal display device which enables color display, they may be implemented by a translucent liquid crystal display device which enables color display or monochrome display, a reflecting liquid crystal display device, an Electro Luminescent (EL) device, and a translucent half-reflecting liquid crystal display device which enables monochrome display in other embodiments of the invention. In this embodiment, The display face of the outer display 16 is formed smaller than the display face of the inner display 15.

The outer operation section 17 is a second operation section and is provided in an area other than the exposed area of the first or second movable part whichever comes behind the outer display 16 in a closed condition where the first and second movable parts 12, 13 are opposed to each other. As mentioned earlier, in configuration where the outer display 16 is provided, assuming that the area where the outer display 16 of the portable information processing apparatus 11 is provided in a closed condition where the first and second movable parts 12, 13 are opposed to each other is the front side, the outer operation section 17 is provided on one of the side face and free end face of the second movable part 13 and the front face, side face and free end face of the first movable part 12, not the rear face of the portable information processing apparatus 1. In this embodiment, assuming that the area where the outer display 16 of the portable information processing apparatus 11 is provided in a closed condition where the first and second movable parts 12, 13 are opposed to each other is the front face, the outer operation section 17 is provided between the outer display 16 and a hinge 23 on the front of the first movable part 12. The outer operation section 17 has a plurality of operation keys for entering predetermined information such as an instruction to the portable information processing apparatus 11. The outer operation section 17 supplies an instruction signal corresponding to each key to a controller 31 mentioned later by way of operation of the operation keys.

The imaging section 18 is provided while oriented externally in an area exposed to the outside in a closed condition. In particular, the imaging section 18 is provided facing the same side as the side where the display face of the outer display 16 faces. By arranging the imaging section 18 in this way, it is possible to shoot a desired image with the imaging section 18 even in a closed condition. The imaging section 18 converts an incident light to an electric signal and generates image data. The imaging section 18 is provided on the free end 24 of the first movable part 12, in a closer location than the outer display 16. The imaging section 18 has an imaging lens, an image pickup device such as a Charge Coupled Device (CCD) image sensor and a Complementary Metal Oxide Semiconductor (CMOS) image sensor, color filters of three colors, Red (R), Green (G) and Blue (B), and a micro-lens array. The imaging section 18 produces three-color lights of R, G, B through color filters from a light reflected on a subject and incident on the imaging lens, and converts each of the three-color lights of R, U, B to an electric signal by way of the image pickup device.

The antenna 19 is provided on the first movable part 12. The antenna 19 is a telescopic rod antenna. When the antenna 19 is retracted, most of the antenna 19 is housed inside the first movable part 12 and its tip protrudes from the free end 24 of the first movable part 12. When the antenna 19 is extended, most of the antenna 19 protrudes from the first movable part 12.

Figure 3:
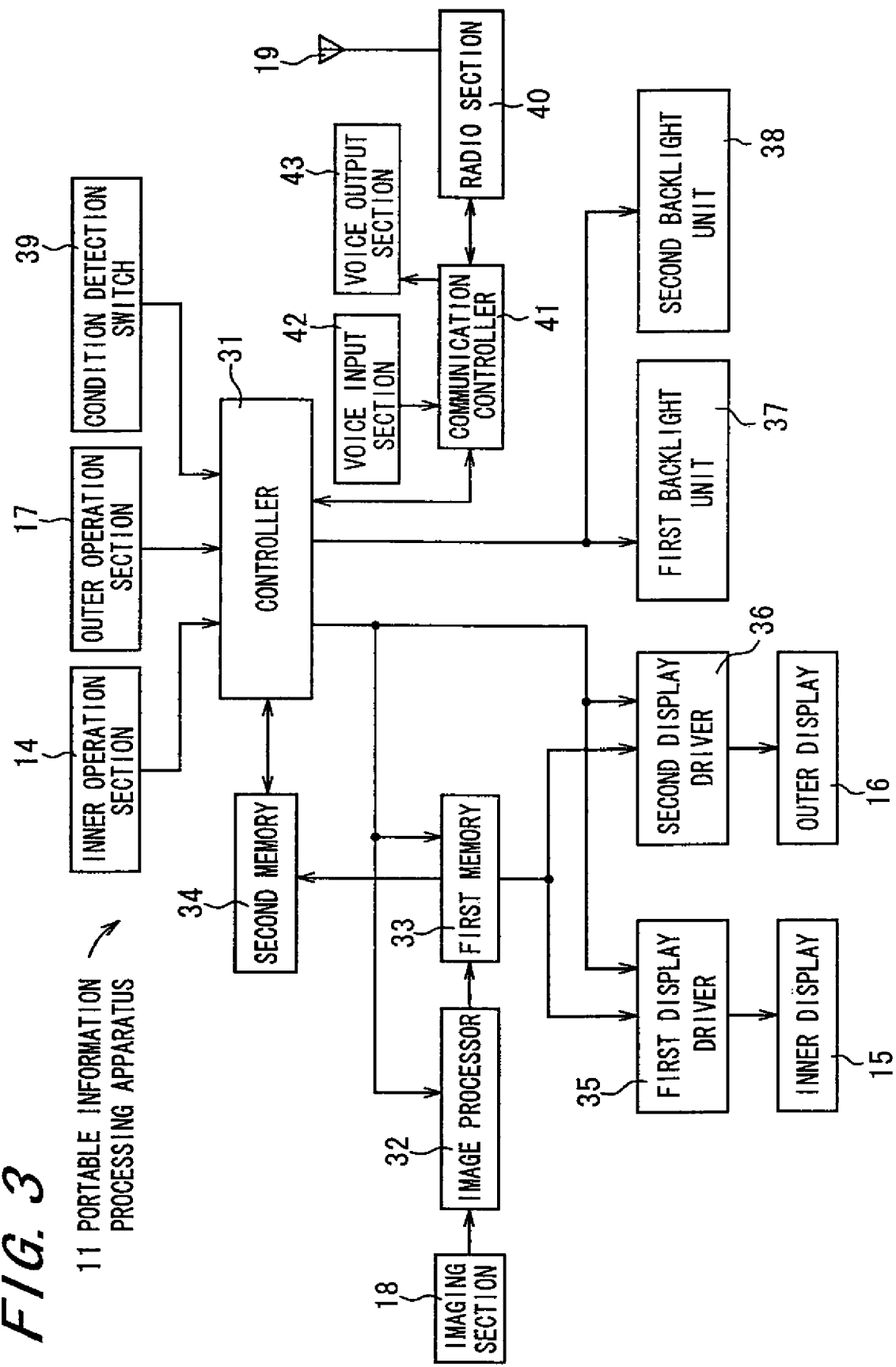
FIG. 3 is a block diagram showing the electrical configuration of the portable information processing apparatus.

FIG. 3 is a block diagram showing the electrical configuration of the portable information processing apparatus 11. The portable information processing apparatus 11 comprises a controller 31, an image processor 32, a first memory 33, a second memory 34, a first display driver 35, a second display driver 36, a first backlight unit 37, a second backlight unit 38, a condition detecting switch 39, a radio section 40, a communication controller 41, a voice input section 42 and a voice output section 43, as well as the first and second movable parts 12, 13, the inner operation section 14, the inner display 15, the outer display 16, the outer operation section 17, the imaging section 18 and the antenna 19.

The controller 31 includes a Central Processing Unit (CPU) and performs control of each section of the portable information processing apparatus 11 based on its internally stored control program. The controller 31 supplies a control signal to each section of the portable information processing apparatus 11 to control operation of each section in response to the predetermined information entered from the inner operation section 14 and the outer operation section 17 and the condition detecting switch 39 mentioned later. The control program includes a program to transmit/receive electronic mails. The controller 31 can transmit an electronic mail to a predetermined destination or receive an incoming electronic mail via the communication controller 41 and the radio section 40 mentioned later.

The image processor 32 includes an amplifier, an analog/digital (A/D) converter and a signal processor. The amplifier amplifies an electric signal corresponding to each of the three-color lights of R, G, B supplied from the imaging section 18 and supplies the resulting electric signal to the A/D converter. The A/D converter converts the analog electric signal corresponding to each of the lights R, G, B amplified by the amplifier to generate image data, and then supply the image data to a signal processor.

The signal processor performs signal processing such as interpolation of pixels on the image data supplied from the A/D converter. The signal processor supplies signal-processed image data to the first memory 33 based on the control signal supplied from the controller 31.

The first memory 33 is storage means for temporarily storing image data continuously supplied from the image processor 32. The first memory 33 stores image data of a plurality of screens. Of the image data stored into the first memory 33, chronologically old image data is erased or overwritten with the chronologically newest image data so that image data is temporarily stored into the first memory 33. The first memory 33 is implemented by a volatile memory such as the Static Random Access Memory (SRAM).

The second memory 34 is storage means. In case predetermined information entered from the inner operation section 14 or outer operation section 17, in this example an instruction to store an image shot with the imaging section 18 is input, the second memory 34 stores predetermined image data of the image data stored in the first memory 33 based on a control signal supplied by the controller 31 in response to this instruction. The second memory 34 stores predetermined information such as text data entered from the inner operation section 14 as well as image data and text data received via the communication controller 41 mentioned later. The second memory 34 is implemented by a nonvolatile memory such as a flash memory.

To any one of the plurality of operation keys in the inner operation section 14 is assigned a shutter key used to enter predetermined information for storing an image shot with the imaging section 18 into the second memory 34. The operator operates the shutter key to store an image shot with the imaging section 18 into the second memory 34.

To any one of the plurality of operation keys of the outer operation section 17 is assigned a shutter key used to enter predetermined information for storing an image shot with the imaging section 18 into the second memory 34. The operator operates the shutter key to store an image shot with the imaging section 18 into the second memory 34.

The controller 31, in response to predetermined information for photographing with the imaging section 18 entered from one of the inner operation section 14 and the outer operation section 17, displays an image shot with the imaging section 18 on the inner display 15 corresponding to the inner operation section 14 in case the predetermined information for photographing with the imaging section 18 is entered from the inner operation section 14. The controller 31 displays an image shot with the imaging section 18 on the outer display 16 corresponding to the outer operation section 17 in case the predetermined information for photographing with the imaging section 18 is entered from the outer operation section 17. Thus, the operator can enter predetermined information from the inner operation section 14 or outer operation section 17 while watching the inner display 15 or outer display 16 and checking the condition of the image shot with the imaging section 18. This enhances the operability.

In case the predetermined information for photographing with the imaging section 18 is entered from the inner operation section 14, the controller 31 supplies the image data stored into the first memory 33 to at least the first driver 35. In case the predetermined information for photographing with the imaging section 18 is entered from the outer operation section 17, the controller 31 supplies the image data stored into the first memory 33 to at least the second driver 36.

The first and second drivers 35, 36 apply a driving voltage to each pixel electrode of the first and second displays 32, 33 based on at least one of the image data and text data temporarily stored into the first memory 33 or stored into the second memory 34 and displayed on the first and second displays 32, 33. As a result, a predetermined display content is displayed at least on one of the first and second displays 32, 33, that is, the first display 32, the second display 33, or the first and second displays 32, 33.

The first display driver 35 is a driving circuit for the inner display 15. The first display driver 35 applies a driving voltage to each pixel electrode of the inner display 15 based on the image data supplied from the first memory 33 or at least either the image data and text data supplied from the second memory 34. The second display driver 36 is a driving circuit for the outer display 16. The second display driver 36 applies a driving voltage to each pixel electrode of the outer display 16 based on the image data supplied from the first memory 33 or at least one of the image data and text data supplied from the second memory 34.

The inner display 15, driven by the first display driver 35, displays at least an image shot with the imaging section 18. The outer display 16, driven by the second display driver 36, displays at least an image shot with the imaging section 18.

The first backlight unit 37 is provided on the back of the inner display 15 as viewed from the display face and irradiates a light onto the inner display 15. The second backlight unit 38 is provided on the back of the outer display 16 as viewed from the display face and irradiates a light onto the outer display 16. The first and second backlight units 37, 38 are so-called side-light-type backlight unit and each comprises a light-emitting device such as a light-emitting diode and a light guide plate including an optical filter. The first and second backlight units 37, 38 each arranges the light-emitting device on the side of the light guide plate in a direction perpendicular to the direction of thickness of the light guide plate, guides a light emitted by the light-emitting device toward the display face by way of a pattern formed on the light guide plate and irradiates the display face as a back light. A control signal is supplied by the controller 31 to the first and second backlight units 37, 38 for turning on/off the light-emitting device and brightness control. By providing the first and second backlight units 37, 38, a predetermined display content at least on one of the inner display 15 and the outer display 16 is made easier-to-see, even when the periphery of the portable information processing apparatus 11 is dark, thereby enhancing the visibility.

The first and second backlight units 37, 38 are independently controlled by the controller 31. In case a predetermined display content is displayed on the inner display 15, the controller 31 turns on the light-emitting device of the first backlight unit 37. In case a predetermined display content is displayed on the outer display 16, the controller 31 turns on the light-emitting device of the second backlight unit 38. Each light-emitting device of the first and second backlight units 37, 38 remains turned on until predetermined information for turning off the light-emitting device is entered by the operator from the inner operation section 14 or outer operation section 17. In a further embodiment of the invention, each light-emitting device of the first and second backlight units 37, 38 may be turned off by the controller 31 when a predetermined interval of time has elapsed since it started to illuminate.

The condition detecting switch 39 is a part of a condition detector for detecting a closed condition and an open condition of the first and second movable parts 12, 13. The condition detector comprises a protrusion 145 provided on the first movable part 12, a hole 46 formed in the second movable part 13, the condition detecting switch 39, and the controller 31.

Figure 4A:
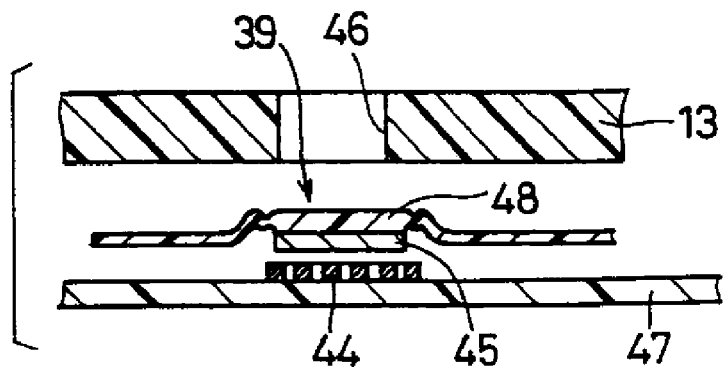
FIG. 4A is a sectional view of a condition detecting switch.
Figure 4B:
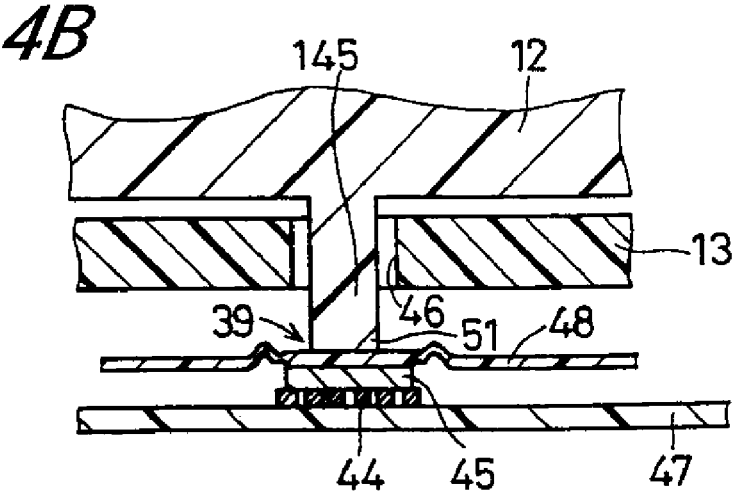
FIG. 4B is a sectional view of a condition detecting switch.

FIGS. 4A and 4B are sectional views of the condition detecting switch 39. FIG. 4A is a sectional view of the condition detecting switch 39 assumed when the first and second movable parts 12, 13 are in an open condition. FIG. 4B is a sectional view of the condition detecting switch 39 assumed when the first and second movable parts 12, 13 are in a closed condition.

The protrusion 145 is provided between the inner display 15 and a hinge 23 in close proximity to the hinge 23 of the first movable part 12 and protrudes toward the second movable part 13 in a closed condition where the first and second movable parts 12, 13 are opposed to each other.

The hole 46 is provided in an area facing the protrusion 145 in close proximity to the hinge 23 of the second movable part 13 in a closed condition where the first and second movable parts 12, 13 are opposed to each other, and formed through the interior and the exterior of the first movable part 12 in the hollow box shape.

The condition detecting switch 39 is provided on a substrate 47 comprising an electric insulation material provided inside first movable part 12. The condition detecting switch 39 has a pattern contact section as a discrete contact section 44 comprising a conductive material, a common contact section 48 comprising a conductive material such as carbon, and a support 49 for supporting the common contact section 48. The support 49 comprises an elastic body such as rubber and supports the discrete contact section 45 with the common contact section 44 and the discrete contact section 45 spaced at a predetermined distance between the hole 46 and the discrete contact section 45.

One set of discrete contacts 44A and the other set of discrete contacts 44B of the discrete contact section 44 are electrically connected to the controller 31 in separate fashion by a lead formed on the substrate 47.

When the portable information processing apparatus 11 is placed in a closed condition where the first and second movable parts 12, 13 are opposed to each other, the protrusion 145 of the first movable part 12 is inserted into the hole 46 of the second movable part 13. The tip 51 of the protrusion 45 presses the common contact section 48 supported by the support 49 of the condition detecting switch 39 against the discrete contact section 44 thereby electrically conducting the one set of discrete contacts 44A and the other set of discrete contacts 44B of the discrete contact section 44 via the common contact section 48. This causes an electric current to flow across the discrete contacts.

The controller 31 detects a current flowing across the discrete contacts and on detection of a current, determines that the first and second movable parts 12, 13 are in a closed condition where the first and second movable parts 12, 13 are opposed to each other.

In case the first and second movable parts 12, 13 are in an open condition, the protrusion 145 of the first movable part 12 departs from the common contact section 48, which in turn departs from the discrete contact section 44 by way of the elastic force of the support 49. In this practice, it is impossible to cause a current to flow across discrete contacts so that the controller 31 determines that the first and second movable parts 12, 13 are not in an open condition, that is, the first and second movable parts 12, 13 are in a closed condition. In this way, on the portable information processing apparatus 11, with a simple configuration, the controller 31 can readily detect the open condition or closed condition of the first and second movable parts 12, 13, that is, whether the first and second movable parts 12, 13 are in an open condition or in a closed condition, based on the state of the condition detecting switch 39.

Figure 5:
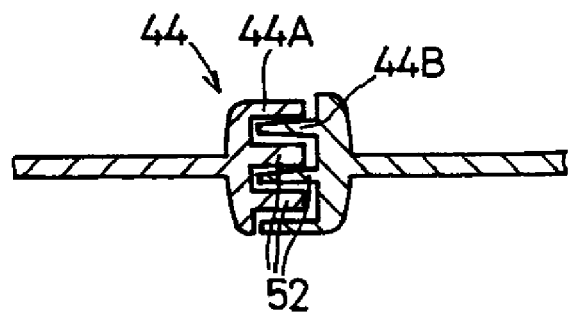
FIG. 5 is a plan view of the discrete contact section of the condition detecting switch.

FIG. 5 is a plan view of the discrete contact section 44 of the condition detecting switch 39. The discrete contact section 44 is formed so that one set of discrete contacts 44A and the other set of discrete contacts 44B formed in the shape of comb teeth are spaced from each other in the direction of the face of the substrate 47 to be engaged. The common contact section 48 comes in contact with a plurality of tongues 52 of one or the other sets of discrete contacts 44A, 44B having a shape of comb teeth. Even in case some of the plurality of tongues 52 do not come into contact with the common contact section 48, the other tongues 52 remain in contact with the common contact section 48. This secures electrical connection between one and the other sets of discrete contacts 44A, 44B, thereby preventing possible poor contact of the discrete contact section 44 and the common contact section 48 while the press of the protrusion 145 against the common contact section 48 is imperfect. Thus the controller 31 can detect, with a simple configuration, detect the closed condition and the open condition of the first and second movable parts 12, 13 without fail.

In another embodiment of the invention, the condition detecting switch 39 is not limited to the aforementioned configuration but may be for example a membrane switch. The configuration of the condition detector including the condition detecting switch 39 is not limited to the aforementioned configuration but may be any configuration as long as it is possible to detect the closed condition and the open condition of the first and second movable parts 12, 13.

The antenna 19 transmits/receives voice data, text data and image data by way of radio communications with a base station over radio waves.

The radio section 40 demodulates text data, image data and voice data received from the base station via the antenna 19 and modulates and amplifies text data, image data and voice data transmitted from the communication controller 41 mentioned later and transmits the resulting data to the base station via the antenna 19.

The communication controller 41 transmits received data such as text data and image data demodulated by the radio section 40 to the controller 31 based on a predetermined communications protocol and transmits voice data demodulated by the radio section 40 to a voice output section 43. Data such as text data and image data received from the distant party via the radio section 40 and the communication controller 41 is stored into the second memory 34. The communication controller 41 transmits the send data such as text data and image data stored into the second memory 34 and voice data input from the voice input section 42 mentioned later to the radio section 40.

The voice input section 42 is implemented for example by a microphone and used to input voice data. The voice input section 42 is provided in the inner space of the second movable part 13 in the center of a free end 25. In a closed condition where the first and second movable parts 12, 13 are opposed to each other, at the free end 25 in an area of the second movable part 13 opposed to the first movable part 12 is formed a through hole 54 which penetrates the inner space and the outer space of the second movable part 13 where the voice input section 42 is provided.

The voice output section 43 is implemented for example by a loudspeaker and sounds based on the voice data supplied from the radio communication section 41. The voice output section 43 is provided in the inner space of the first movable part 12 in the center of a free end 24. In a closed condition where the first and second movable parts 12, 13 are opposed to each other, at the free end 24 in an area of the first movable part 12 opposed to the second movable part 13 is formed a through hole 53 which penetrates the inner space and the outer space of the first movable part 12 where the voice output section 43 is provided.

Figure 6:
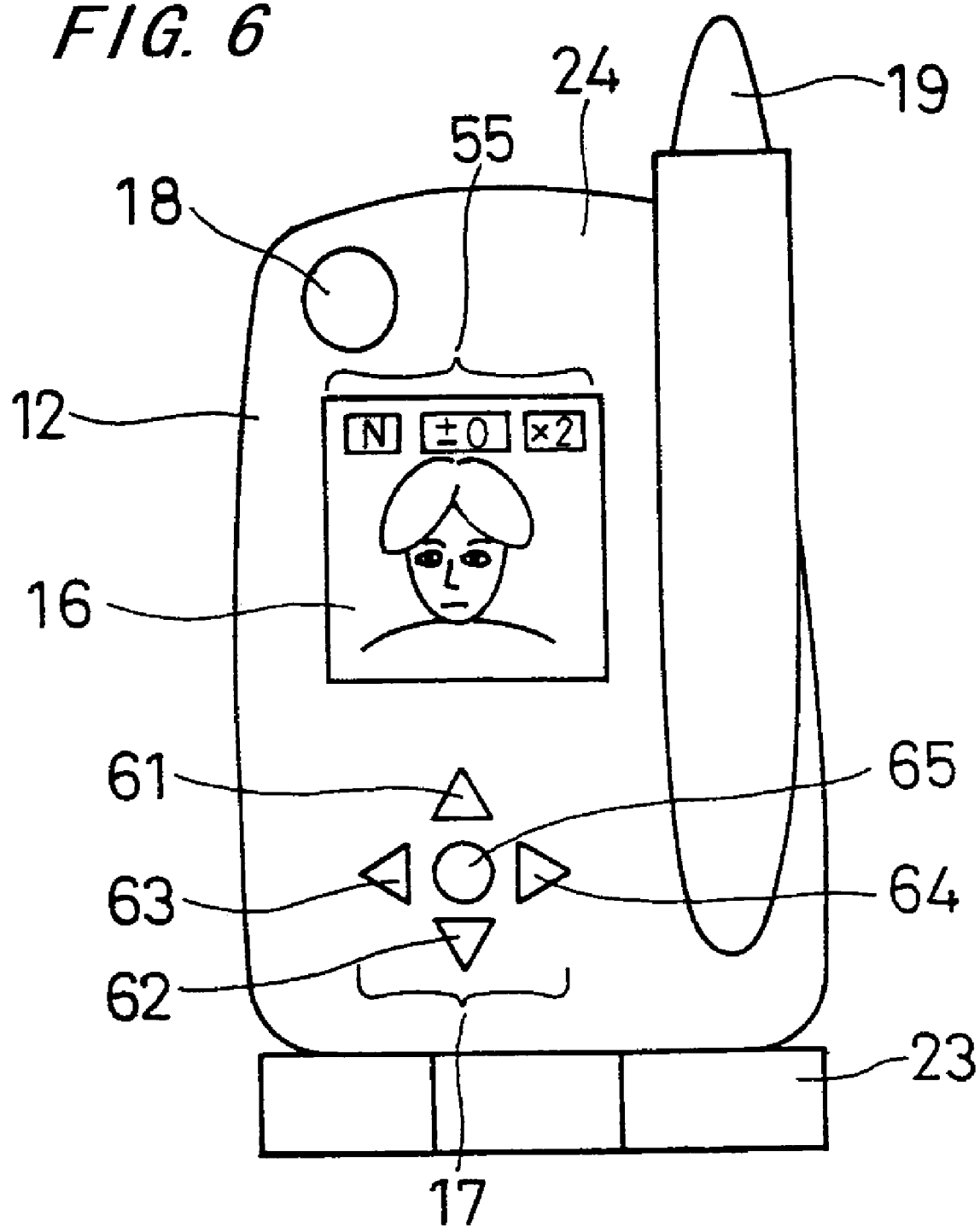
FIG. 6 shows the display content of an image shot with an imaging section on an outer display.

FIG. 6 shows the display content of an image shot with an imaging section 18 on an outer display 16. In case an image shot with the imaging section 18 is displayed on the outer display 16 and the outer display 16 is used as a camera finder, the image shot with the imaging section 18 is displayed on the outer display 16 and a content 55 showing the setting on photographing is displayed at the end of the display screen. In this embodiment, the free end 24 of the first movable part 12 is assumed as top and the hinge 23 as bottom.

The content 55 showing the setting on photographing shows for example shooting mode setting, exposure correction setting and ZOOM/WIDE setting, arranged in this order at the top end of the outer display 16. Setting of shooting mode is the character N (Normal) for a standard setting. Exposure correction setting is for example 0 as a default and the numeric value+N (N being a positive integer) for a setting brighter than the default, and the numeric value−N (N being a positive integer) for a setting darker than the default. The exposure correction setting is adjustable in predetermined steps. A numeric value representing the exposure setting on the display is incremented by 1 each time the setting becomes brighter by one step, and decremented by 1 each time the setting becomes darker by one step. For the ZOOM/WIDE setting, the numeric value×N (N being a zoom magnification) is displayed in the zoom setting while the character W is displayed in the wide angle setting where photographing is made using a wide angle lens. The user references the content 55 showing the setting on photographing to check and clearly grasp the current setting.

The operation keys in the outer operation section 17 comprises an UP key 61 positioned in the upper portion, a DOWN key 62 positioned in the lower portion, a LEFT key 63 positioned in the left portion, RIGHT key 64 positioned in the right portion, viewed from the side of the outer operation section 17, and a CENTER key 65 positioned in the center of the UP key 61, DOWN key 62, LEFT key 63 and RIGHT key 64, and the keys are arranged in the shape of a cross. By pressing each operation key, it is possible to enter predetermined information corresponding to each operation key. In this embodiment, each key in the outer operation section 17 is a push key for entering predetermined information by pushing.

For example, by pressing the UP key 61 or DOWN key 62, exposure correction setting is modified. By pressing the LEFT key 63 or RIGHT key 64, ZOOM/WIDE setting is modified. For example, by holding down the CENTER key 65 for a predetermined interval of time, a function menu screen 68 mentioned later can be displayed on the outer display 16. For example, by holding down the CENTER key 65 for a shorter interval than the predetermined interval of time, an image shot with the imaging section 18 can be stored in the second memory 34, that is, the CENTER key 65 functions as a shutter key. The operation keys are assigned so that predetermined information is entered in response to respective operation keys.

The portable information processing apparatus 11 comprises the outer operation section 17. Even in a closed condition where the first and second movable parts 12, 13 are opposed to each other, it is possible to readily enter information on a predetermined display content on the outer display 16, the image shot with the imaging section 18 in this case, for example the information on the setting related to photographing, while checking the image shot with the imaging section 18.

Figure 7:
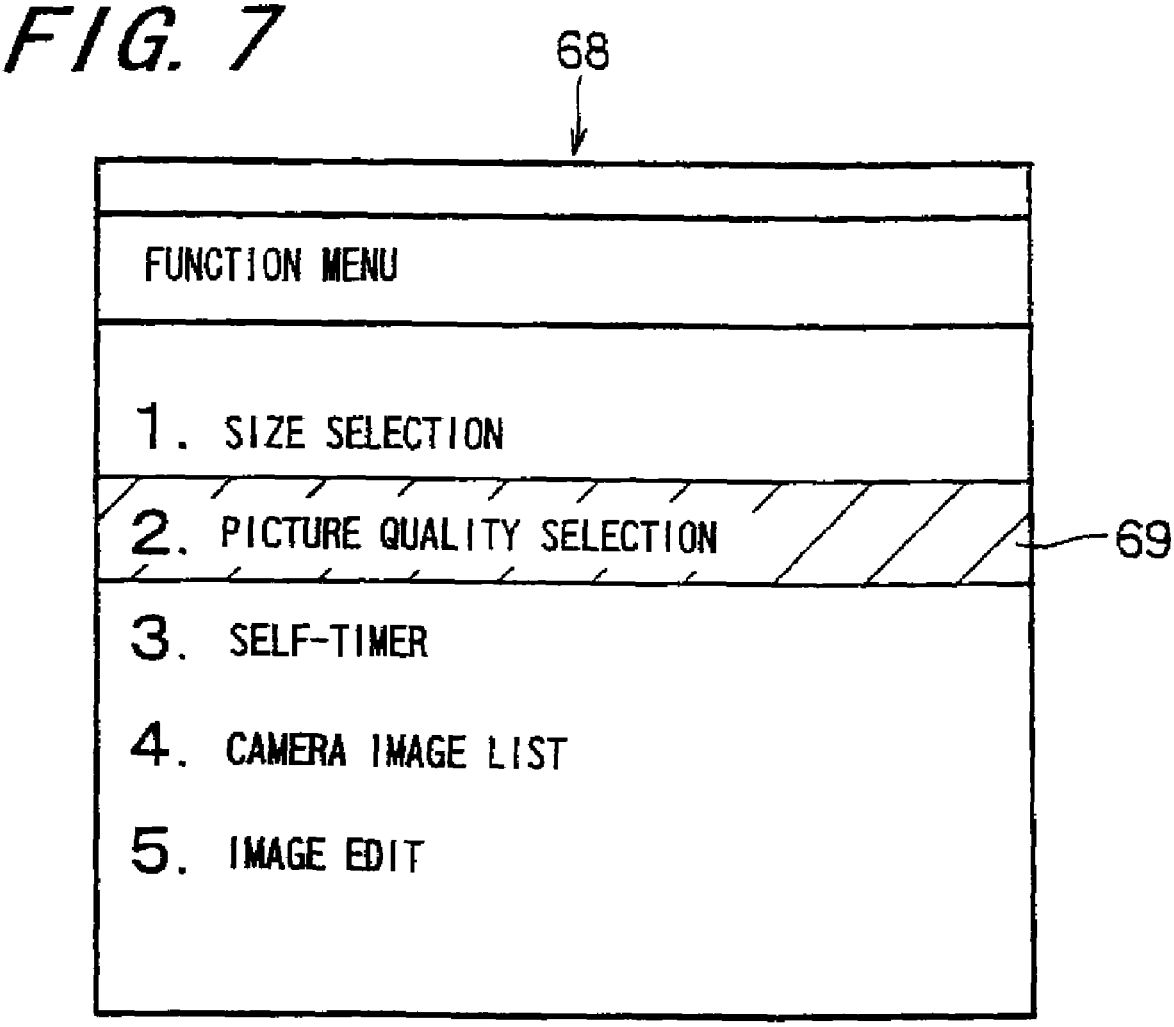
FIG. 7 shows a function menu screen displayed on the outer display.

FIG. 7 shows a function menu screen 68 displayed on the outer display 16. The function menu screen 68 is displayed on the outer display 16 by holding down the CENTER key 65 for a predetermined interval of time. The function menu screen 68 displays function setting items including. Item 1. Size Selection; Item 2. Picture Quality Selection; Item 3. Self-timer; Item 4. Camera Image List; and Item 5. Image Edit. The operator can choose each item from the outer operation section 17.

When "Item 1. Size Selection" is chosen, the size of an image to be shot with the imaging section 18 is selected from among a plurality of sizes. When "Item 2. Picture Quality Selection" is chosen, the number of gray scale levels of an image shot with the imaging section 18 is modified and the image data size is modified also. When "Item 3. Self-timer" is chosen, the data of an image shot with the imaging section 18 is automatically stored into the second memory 34 with a predetermined interval of time being having elapsed. The image is stored into the second memory 34 even if operator does not press the CENTER key 65 as a shutter key. When "Item 4. Camera Image List" is chosen, the image data stored into the second memory 34 is listed. When "Item 5. Image Edit" is chosen, the image data stored into the second memory 34 is erased.

Setting of the functions displayed on the function menu screen 68 is made from the outer operation section 17. The functions are set to allow entry of predetermined information in correspondence to the operation keys, so that, in case the function menu screen 68 is displayed on the outer display 16, it is possible to move a cursor 69 displayed on the function menu screen 68 to choose an item by pressing the UP key 61 or DOWN key 62, and that, it is possible to validate or cancel the item chosen with the cursor 69 by pressing the CENTER key 65.

Even in case an image shot with the imaging section 18 is displayed on the inner display 15, as in the case where the image is displayed on the outer display 16 as shown in FIG. 6, setting of functions on photographing is displayed. In the inner operation section 14, as is the case with the outer operation section 17, operation keys for entering information concerning the setting on photographing are provided.

The controller 31 switches the display to display an image which is based on the image data temporarily stored in the first memory 33 based on the state of the condition detecting switch 39 during photographing with the imaging section 18. That is, having detected that the first and second movable parts 12, 13 are in an open condition, the controller 31 supplies a control signal to the first memory 33 so as to supply the image data stored in the first memory 33 to the first display driver 35 and displays the image which is based on the image data on the inner display 15.

As mentioned earlier, the imaging section 18 is provided in an exposed area to the outside in a closed condition where the first and the second movable parts 12, 13 are opposed to each other. The operator, if wishing to shoot a subject other than the operator with the imaging section 18, unfolds the portable information processing apparatus 11 to perform photographing with the imaging section 18 oriented in a direction departing from the operator. This allows the controller 31 to detect that the portable information processing apparatus 11 is in an open condition and the image shot with the imaging section 18 to be displayed on the inner display 15. This makes it possible to use the inner display 15 as a camera finder.

The operator, if wishing to shoot himself/herself with the imaging section 18, performs photographing with the imaging section 18 facing the operator in a closed condition where the first and second movable parts 12, 13 are opposed to each other. This allows the controller 31 to detect that the portable information processing apparatus 11 is in a closed condition and the image shot with the imaging section 18 to be displayed on the outer display 16. This makes it possible to use the outer display 16 as a camera finder.

Switchover of the camera finder display from the inner display 15 to the outer display 16 is made by the controller 31 when the portable information processing apparatus 11 is placed into a closed condition where the first and second movable parts 12, 13 are opposed to each other from an open condition where the inner display 15 is used as a camera finder. The switchover also takes place when the operator operates specifically assigned operation keys in the inner operation section 14.

Switchover of the camera finder display from the outer display 16 to the inner display 15 is made by the controller 31 when the portable information processing apparatus 11 is placed into an open condition from a closed condition where the first and second movable parts 12, 13 are opposed to each other. The switchover also takes place when the operator operates specifically assigned operation keys in the inner operation section 14 in case the outer display 16 is used as a camera finder in an open condition.

In this way, on the portable information processing apparatus 11, the operator can readily select whether the image shot with the imaging section 18 is to be displayed on the inner display 15 or outer display 16. Thus, the operator can promptly display an image shot with the imaging section 18 on a display which the operator can watch, in case the imaging section 18 is placed into a condition where the imaging section 18 is oriented in a direction departing from the operator for photographing from a condition where the imaging section 18 faces the operator for photographing, or vice versa.

The controller 31 detects the state of the condition detecting switch 39 and activates one of the inner operation section 14 and the outer operation section 17 and deactivates the other one of the operation section 14 and the outer operation section 17 based on this detection results to switch the operation section from which predetermined information is to be entered.

The controller 31, when it is detected that the portable information processing apparatus 11 is in a closed condition, deactivates the inner operation section 14 and invalidates the input with each operation key in the inner operation section 14, and activates the outer operation section 17 and validates the input with each operation key in the outer operation section 17. The controller 31, when it is detected that the portable information processing apparatus 11 is in an open condition, activates the inner operation section 14 and validates the input with each operation key in the inner operation section 14, and deactivates the outer operation section 17 and invalidates the input with each operation key in the outer operation section 17.

The input with each operation key in the inner operation section 14 and the outer operation section 17 is invalidated by:

mechanically fixing the inner operation section 14 and the outer operation section 17 to prevent operation by the operator; inhibiting output of an instruction signal from the inner operation section 14 and the outer operation section 17 to the controller 31 without mechanically fixing the inner operation section 14 and the outer operation section 17; or inhibiting processing of the instruction signal supplied from the inner operation section 14 and the outer operation section 17 by the controller 31.

As mentioned earlier, in case an image shot with the imaging section 18 is displayed on the inner display 15 and the inner display 15 is used as a camera finder, it is detected by the controller 31 that the first and second movable parts 12, 13 are in an open condition and the inner operation section 14 is activated. This validates the input with an operation key assigned to modify the setting on photographing. Thus, the operator can enter predetermined information with the inner operation section 14 arranged on the same side as the inner display 15 while watching the image shot with the imaging section 18 displayed on the inner display 15. In this practice, the controller 31 deactivates the outer operation section 17 thus preventing the outer operation section 17 from undesirably coming into contact with an object thereby avoiding malfunction.

As mentioned earlier, in case an image shot with the imaging section 18 is displayed on the outer display 16 and the outer display 16 is used as a camera finder, it is detected by the controller 31 that the first and second movable parts 12, 13 are in a closed condition and the outer operation section 17 is activated. This validates the input with an operation key assigned to modify the setting on photographing. Thus, the operator can enter predetermined information with the outer operation section 17 arranged on the same side as the outer display 16 while watching the image shot with the imaging section 18 displayed on the outer display 16.

In the inner operation section 14 is provided an operation selector key for activating one of the inner operation section 14 and the outer operation section 17 and deactivating the other one of the inner operation section 14 and the outer operation section 17. The operation selector key is implemented by assigning one of the plurality of key switches in the inner operation section 14 to particular one. By providing an operation selector key, it is possible to modify the setting on whether the input from the inner operation section 14 or input from the outer operation section 17 is validated. This allows input of predetermined information from the outer operation section 17 even in a condition where the first and second movable parts 12, 13 unfold, which enhances the operability.

In another embodiment of the invention, the operation selector key may be provided in the outer operation section 17, or in each of the inner operation section 14 and the outer operation section 17.

The protrusion 145, hole 46 and condition detecting switch 39 are provided in close proximity to the hinge 23. Thus, the state of the condition detecting switch 39 changes even by a slight angle displacement about the hinge 23 from a closed condition of the first and second movable parts 12, 13. In the use condition where the first and second movable parts 12, 13 unfold by 90 degrees or more and 180 degrees or less about the hinge from a closed condition, setting in the operation section to activate the inner operation section 14 and deactivate the outer operation section 17 is complete. In case the first and second movable parts 12, 13 are placed in a closed condition from an open condition, response of switchover of the operation section is quick. In case the first and second movable parts 12, 13 are placed into an open condition from a closed condition, the operation section is not switched promptly thus preventing malfunction.

Figure 8:
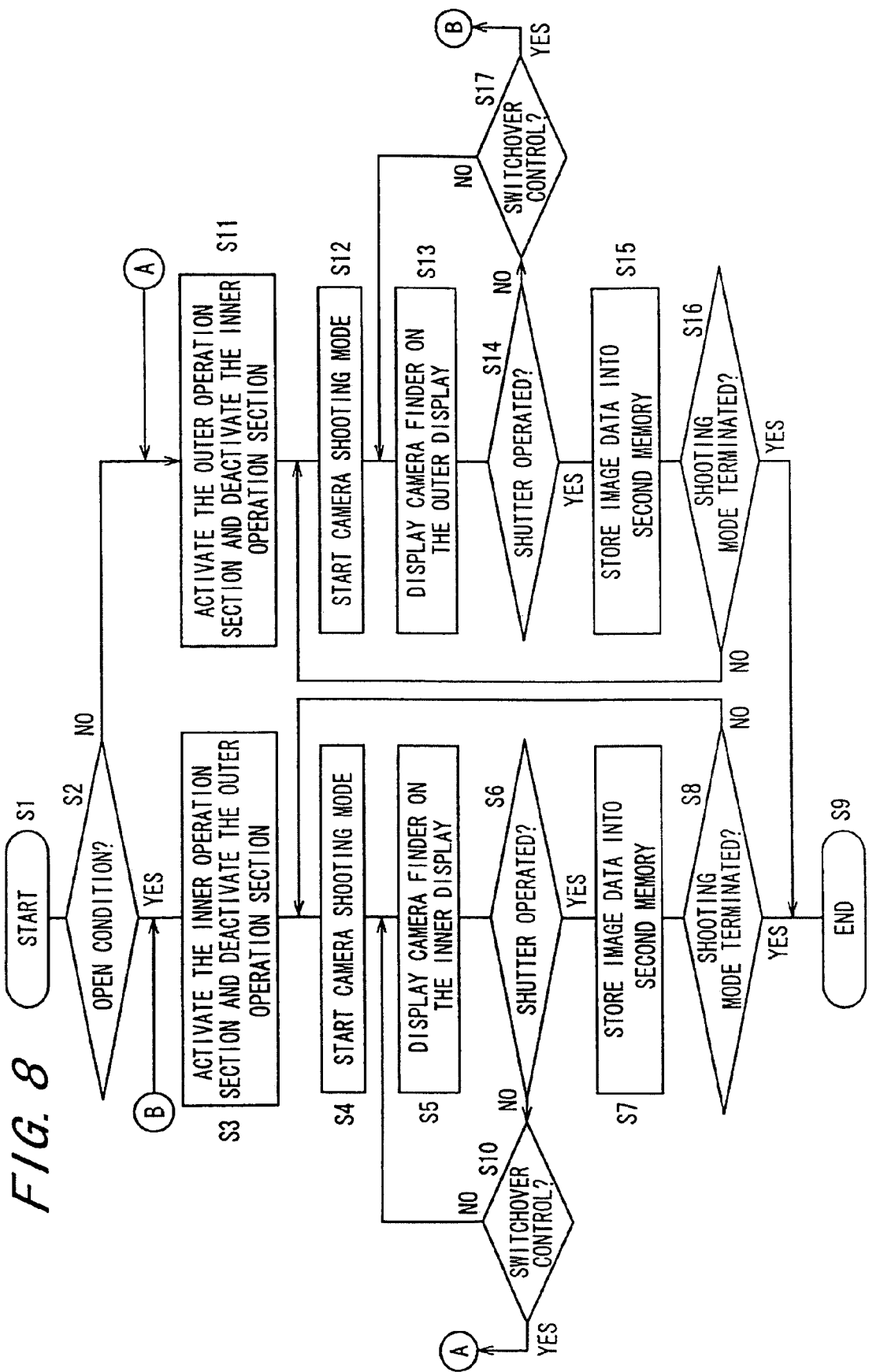
FIG. 8 is a flowchart showing the processing operation of a controller assumed when photographing is made with the imaging section.

FIG. 8 is a flowchart showing the processing operation of a controller 31 assumed when photographing is made with an imaging section 18. Execution proceeds from step S1 to step S2 where it is determined whether a first and a second movable parts 12, 13 are in an open condition based on the state of the condition detecting switch 39. In case it is determined that the first and second movable parts 12, 13 are in an open condition in step S2, execution proceeds to step S3. When it is determined that the first and second movable parts 12, 13 are not in open condition in step S2, execution proceeds to step S11.

In step S3, an inner operation section 14 is activated and an outer operation section 17 is deactivated. This validates only the input from the inner operation section 14.

In step S4, a camera shooting mode is started. That is, a control signal is supplied to an image processor 32 to cause a first memory 33 to store image data. Execution then proceeds to step S5.

In step S5, a control signal is supplied to the first memory 33 to cause image data stored in the first memory 33 to be supplied to a first display driver 38. Then the image shot with the imaging section 18 is displayed on the inner display 15. Execution then proceeds to step S6. This allows the inner display 15 to be used as a camera finder.

In step S6, it is determined whether a shutter button for inputting an instruction to store image data of an image generated with the imaging section 18 into a second memory 34 has been operated. In case it is determined that the shutter button has been operated in step S6, execution proceeds to step S7. In case it is determined that the shutter button has not been operated in step S6, execution proceeds to step S10.

In step S7, a control signal is supplied to the second memory 34 to cause image data of an image shot with the imaging section 18 to be stored into the second memory 34, and execution proceeds to step S8. In step S8, it is determined whether an instruction to quit the shooting mode has been issued, that is, an instruction to stop photographing with the imaging section 18 has been input from the inner operation section 14. In case it is determined that an instruction to quit the shooting mode has been issued in step S8, execution proceeds to step S9 where processing is terminated. In case it is determined that an instruction to quit the shooting mode has not been issued in step S8, execution proceeds to step S4. The instruction to quit the shooting mode is issued for example when the operator operates the shooting termination key assigned to any one of the operation keys in the inner operation section 14.

In step S10, it is determined whether the display for displaying an image shot with the imaging section 18 on the outer display 16 has been switched over. Switchover of the display from the inner display 15 to the outer display 16 is determined based on whether the state of the condition detecting switch 39 has changed or whether a display selector key provided in the inner display 15 has been operated. In case it is determined that the display has been switched over in step S10, execution proceeds to step S11. In case it is determined that the display has not been switched over in step S10, execution proceeds to step S5.

In step S11, the outer operation section 17 is activated and the inner operation section 14 is deactivated. This validates only the input from the outer operation section 17.

In step S12, the camera shooting mode is started, that is, a control signal is supplied to the image processor 32 to cause the first memory 33 to store image data, and photographing is performed by the imaging section 18. Execution then proceeds to step S13. In step S13, a control signal is supplied to the first memory 33 to cause image data stored in the first memory 33 to be supplied to a second display driver 36. Then the image which is based on the image data generated by the imaging section 18 is displayed on the outer display 16. Execution then proceeds to step S14. This allows the outer display 16 to be used as a camera finder.

In step S14, a control signal is supplied to the second memory 34 and it is determined whether a shutter button for inputting an instruction to store image data of an image shot with the imaging section 18 into the second memory 34 has been operated. In case it is determined that the shutter button has been operated in step S14, execution proceeds to step S15. In case it is determined that the shutter button has not been operated in step S14, execution proceeds to step S17.

In step S15, the data of an image shot with the imaging section 18 is stored into the second memory 34 and execution proceeds to step S16. In step S16, it is determined whether an instruction to quit the shooting mode has been issued, that is, an instruction to stop photographing with the imaging section 18 has been input from the outer operation section 17. In case it is determined that an instruction to quit the shooting mode has been issued in step S16, execution proceeds to step S9 where processing is terminated. In case it is determined that an instruction to quit the shooting mode has not been issued in step S16, execution proceeds to step S12. The instruction to quit the shooting mode with the imaging section 18 is issued for example when the operator continuously presses the CENTER key 65 in the outer operation section 17.

In step S17, it is determined whether the display for displaying an image shot with the imaging section 18 on the inner display 15 has been switched over. Switchover of the display from the outer display 16 to the inner display 15 is determined based on whether the state of the condition detecting switch 39 has changed or whether the display selector key provided in the inner display 15 has been operated. In case it is determined that the display has been switched over in step S17, execution proceeds to step S3. In case it is determined that the display has not been switched over in step S17, execution proceeds to step S13.

The inner operation section 14 is covered by the first movable part 12 when the first and second movable parts 12, 13 are in a closed condition so that the operator cannot operate the inner operation section 14. In another embodiment of the invention, the inner operation section 14 may remain activated in step S3 mentioned earlier.

In another embodiment of the invention, the outer operation section 17 may not be deactivated but may be activated in case the first and second movable parts 12, 13 are in an open condition. In this case, it is possible to enter predetermined information from any one of the inner operation section 14 and the outer operation section 17.

Figure 9:
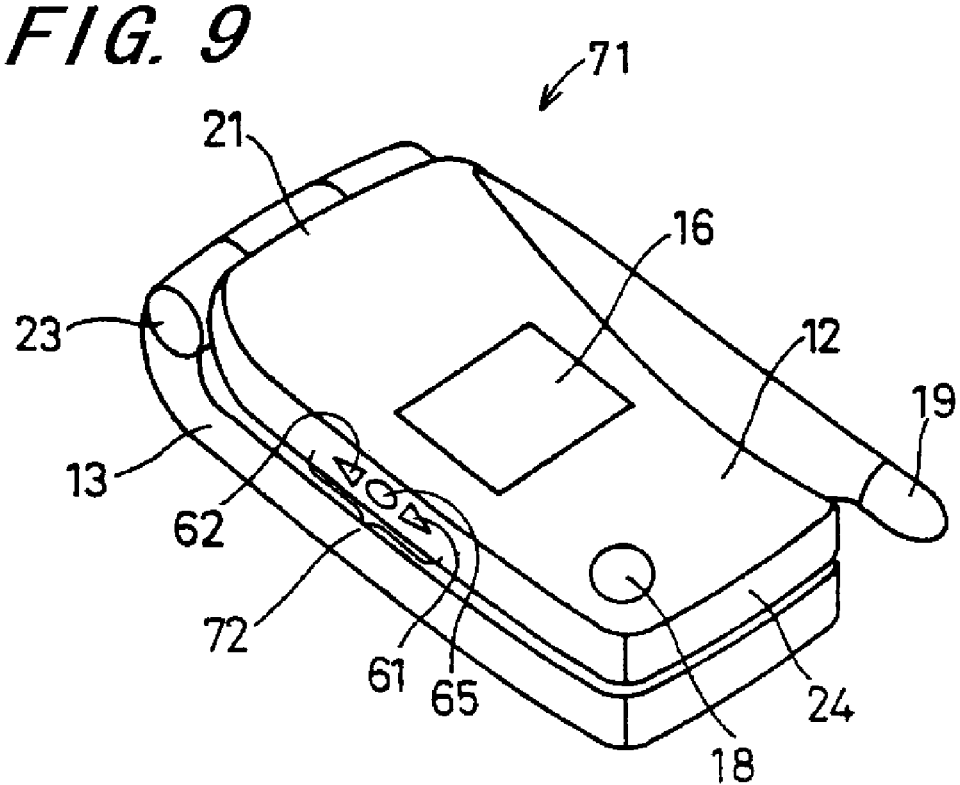
FIG. 9 is a perspective view of portable information processing apparatus according to another embodiment of the invention.

FIG. 9 is a perspective view of portable information processing apparatus 71 according to another embodiment of the invention. The portable information processing apparatus 71 comprises a first movable part and a second movable part 12, 13 connected movably in relative angular displacement from a closed condition where the movable parts are opposed to each other to an open condition where the areas opposed in the closed condition are exposed to the outside, an inner operation section for entering predetermined information, an inner display for displaying a predetermined display content in response to predetermined information entered from the inner operation section, an outer display 16 for displaying a predetermined display content, an outer operation section 72 for entering predetermined information on the predetermined display content displayed on the outer display, an imaging section 18, and an antenna 19. The portable information processing apparatus 71 according to this embodiment has the same configuration as that of the aforementioned embodiment except that the outer operation section 72 is used instead of the outer operation section 17. The same components of the portable information processing apparatus 71 shown in FIG. 9 as those of the portable information processing apparatus 11 are given the same numerals and signs and the corresponding description is omitted. In this embodiment, the free end 24 of the first movable part 12 is assumed as a top and the hinge 23 as a bottom.

The outer operation section 72 is provided on the side of the first movable part 12. The outer operation section 72 has the same configuration as the outer operation section 17 of the portable information processing apparatus 11 according to the aforementioned embodiment and comprises a plurality of operation keys including an UP key 61, a DOWN key 62 and a CENTER key 65. For example, by pressing the UP key 61 or DOWN key 62, it is possible to modify exposure correction setting and ZOOM/WIDE setting.

The outer operation section 72 is arranged on the right-hand side as viewed from the outer display 16. When the operator orients the imaging section 18 toward himself/herself while holding the portable information processing apparatus 71 in his/her right hand, the operator can operate the outer operation section 17 with his/her thumb while holding the entire apparatus. This enhances the operability and prevents the portable information processing apparatus 71 from dropping undesirably.

Figure 10:
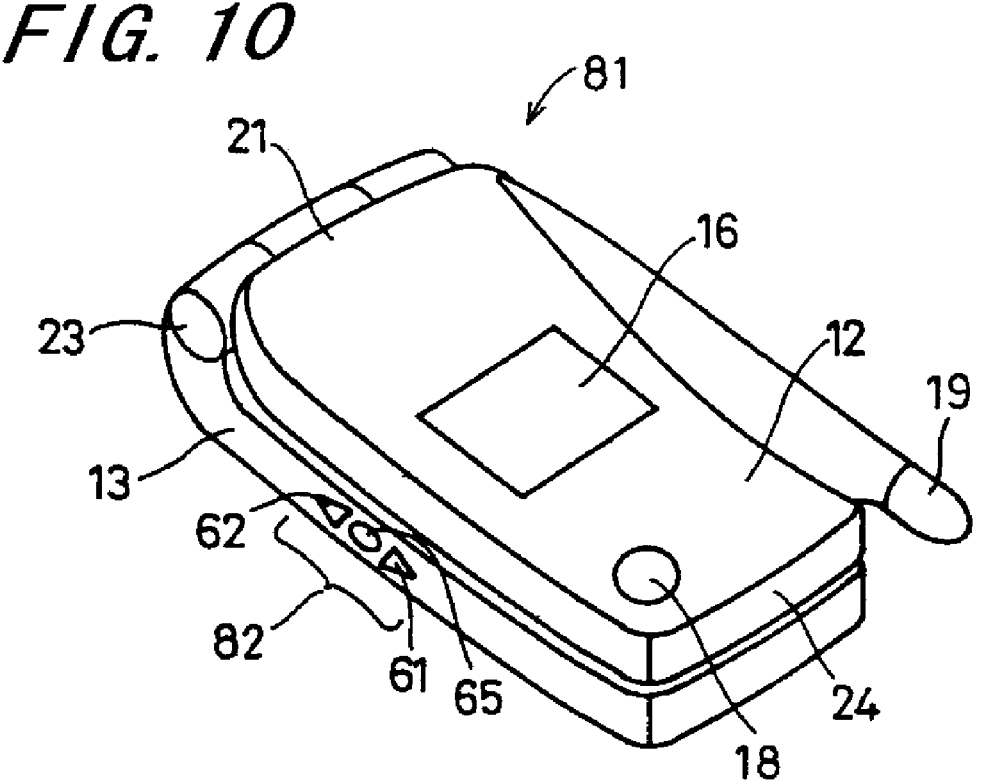
FIG. 10 is a perspective view of portable information processing apparatus according to another embodiment of the invention.

FIG. 10 is a perspective view of portable information processing apparatus 81 according to another embodiment of the invention. The portable information processing apparatus 81 comprises a first movable part 12 and a second movable part 13 connected movably in relative angular displacement from a closed condition where the movable parts are opposed to each other to an open condition where the areas opposed in the closed condition are exposed to the outside, an inner operation section for entering predetermined information, an inner display for displaying a predetermined display content in response to predetermined information entered from the inner operation section, an outer display 16 for displaying a predetermined display content, an outer operation section 82 for entering predetermined information on the predetermined display content displayed on the outer display, an imaging section 18, and an antenna 19. The portable information processing apparatus 81 according to this embodiment has the same configuration as that of the aforementioned embodiment except that the outer operation section 72 is used instead of the outer operation section 17. The same components of the portable information processing apparatus 81 shown in FIG. 10 as those of the portable information processing apparatus 11 are given the same numerals and signs and the corresponding description is omitted. In this embodiment, the free end 24 of the first movable part 12 is assumed as a top and the hinge 23 as a bottom.

The outer operation section 82 is provided on the side of the second movable part 13. The outer operation section 72 has the same configuration as the outer operation section 17 of the portable information processing apparatus 11 according to the aforementioned embodiment and comprises a plurality of operation keys including an UP key 61, a DOWN key 62 and a CENTER key 65. For example, by pressing the UP key 61 or DOWN key 62, it is possible to modify exposure correction setting and ZOOM/WIDE setting.

The outer operation section 82 is arranged to the right-hand side of the second movable part 12 as viewed from the outer display 16 in a closed condition where the first and second movable parts 12, 13 fold closed while opposed to each other. When the operator orients the imaging section 18 toward himself/herself while holding the portable information processing apparatus 81 in his/her right hand, the operator can operate the outer operation section 17 with his/her thumb while holding the entire apparatus. This enhances the operability and prevents the portable information processing apparatus 81 from dropping undesirably.

While the inner display 15 and the outer display 16 are provided on the first movable part in the aforementioned embodiments, the inner display 15 may be provided in an area where the first and second movable parts 12, 13 are opposed to each other in a closed condition where the first and second movable parts 12, 13 fold closed. The outer display 16 may be provided in an area exposed to the outside in a closed condition where the first and second movable parts 12, 13 fold closed.

While the imaging section 18 is arranged closer to the free end 24 than the outer display 16 provided on the free end 24 of the movable part 12 in the aforementioned embodiments, the imaging section 18 may be arranged closer to the hinge 23 than the outer display 16. While the antenna 19 is arranged on the first movable part 12 in the aforementioned embodiments, the antenna 19 may be provided on the second movable part 13.

Figure 11:
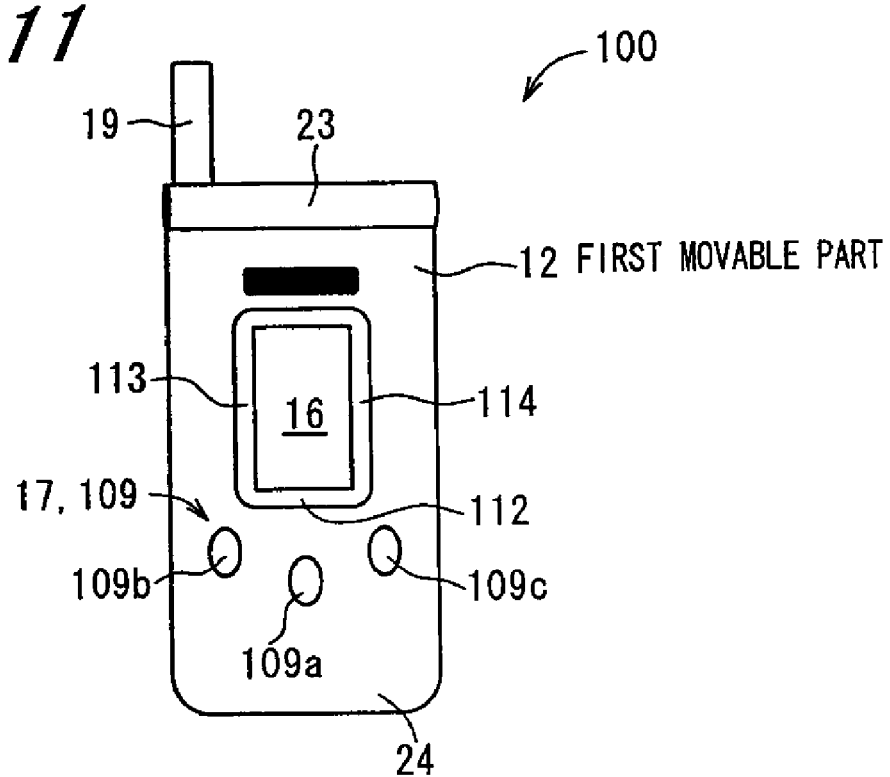
FIG. 11 shows a relationship between the outer display and the keys on the back of the outer operation section of portable information processing apparatus according to another embodiment of the invention.
Figure 12:
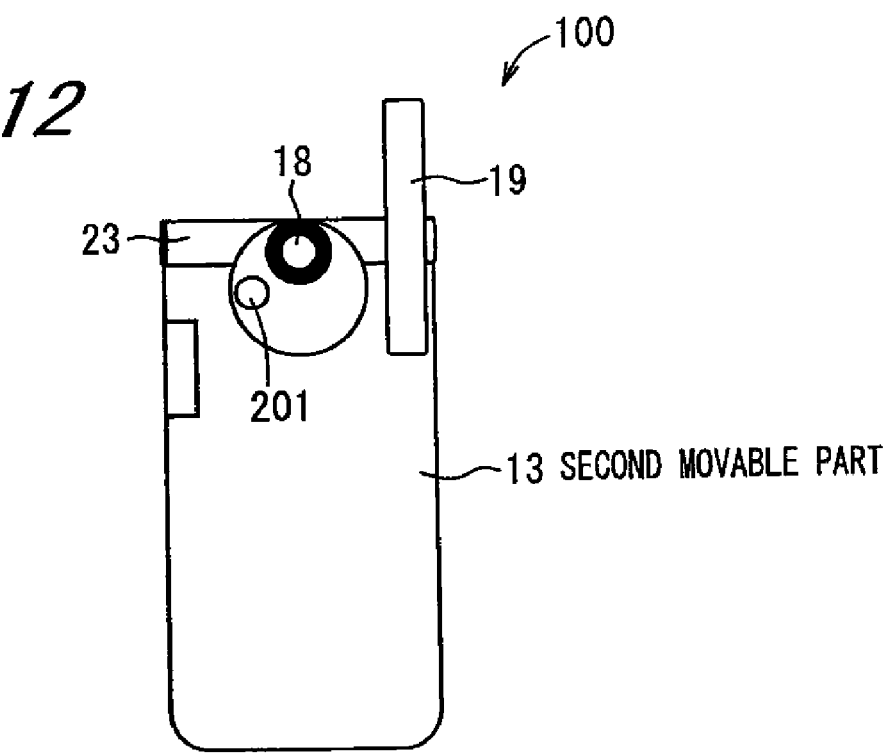
FIG. 12 shows a surface including the imaging section of the portable information processing apparatus in a closed condition.
Figure 13:
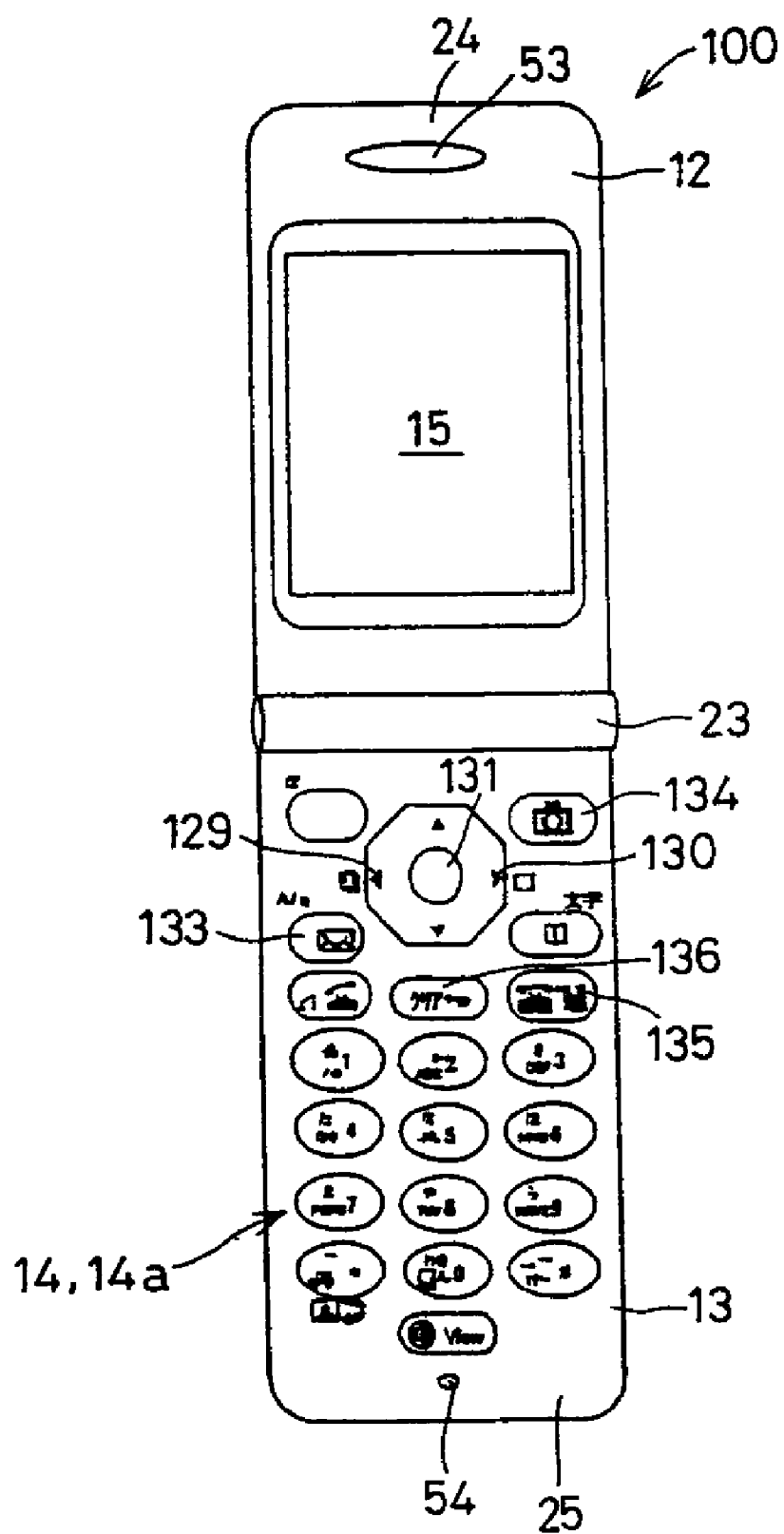
FIG. 13 is a drawing of the portable information processing apparatus in an open condition seen from one side in the direction of thickness.
Figure 14:
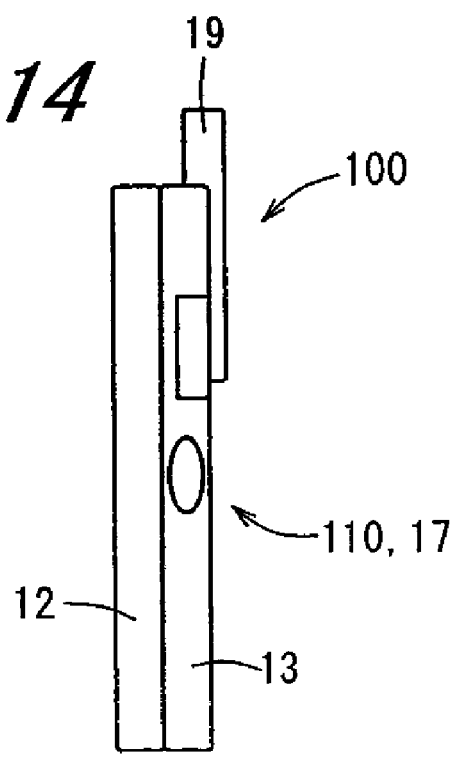
FIG. 14 is a side view of the portable information processing apparatus in a closed condition.
Figure 15:
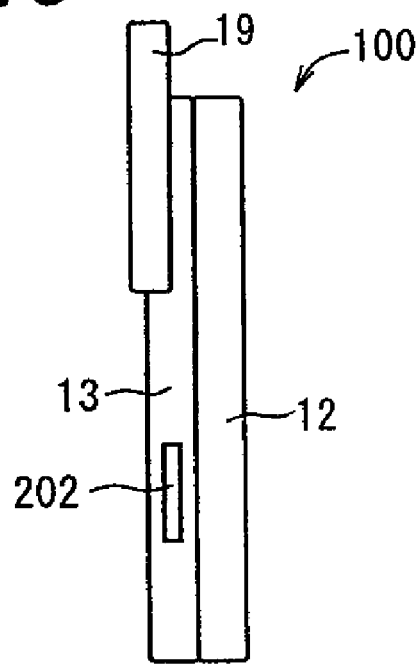
FIG. 15 is another side view of the portable information processing apparatus in a closed condition.

FIG. 11 shows a relationship between the outer display 16 and the keys on the back of the outer operation section 17 of portable information processing apparatus 100 according to another embodiment of the invention. FIG. 12 shows a surface including the imaging section 18 of the portable information processing apparatus 100 in a closed condition. FIG. 13 is a drawing of the portable information processing apparatus 100 in an open condition seen from one side in the direction of thickness. FIG. 14 is a side view of the portable information processing apparatus 100 in a closed condition. FIG. 15 is another side view of the portable information processing apparatus 100 in a closed condition. The portable information processing apparatus 100 according to this embodiment has the same configuration as that of the portable information processing apparatus 11 according to the aforementioned embodiment except that they are different partially. The same components are given the same numerals and signs and the corresponding description is omitted.

This embodiment shows an example of the portable information processing apparatus 100 applied to a folding cellular telephone with a small camera mounted. The portable information processing apparatus 100 may be also applied a variety of cellular telephones including a sliding-type cellular telephone where the first movable part 12 is displaced slidably relative to and approximately in parallel with the second movable part 13, a rotation-type cellular telephone where the first movable part 12 is rotated in displacement about an axis parallel with the direction of thickness of the first movable part 12 with respect to the second movable part 13, and a cellular telephone having a selected combination of the structure of a folding, sliding-type and rotation type.

On the first movable part 12, the outer operation section 17 is provided on each of the back of the inner display 15 (see FIG. 11) and one side of the first movable part 12 (see FIG. 14). In other words, the outer operation section 17 is provided in an area exposed to the outside on the first movable part 12 in a closed condition where the first and second movable parts 12, 13 fold closed. The outer operation section 17 comprises a key operation section 109 provided on the back and a shutter key 110 (see FIG. 14) provided on the side.

The key operation section 109 comprises three back keys 109*a*, 109*b*, 109*c* which are arranged with an appropriate interval among them. Each back key 109*a*, 109*b*, 109*c* shown in FIG. 11 corresponds to an operation piece. One back key 109*a* among the back keys 109*a*, 109*b*, 109*c* is arranged close to the free end of the first movable part 12, in close proximity to the midpoint of one side 112 of a rectangular display area in the outer display 16. The back key 109*a* is defined as a CENTER key 109*a*. Another back key 109*b* is arranged in close proximity to one of the four corners of the rectangular display area, that is, the intersection of the side 112 and one side 113 adjacent thereto. The back key 109*b* is defined as a LEFT key 109*b*. The remaining back key 109*c* is arranged in close proximity to one of the four corners of the rectangular display area, that is, the intersection of the side 112 and one side 114 adjacent thereto. The back key 109*c* is defined as a RIGHT key 109*c*. As mentioned later, by selectively operating the CENTER key 109*a*, LEFT key 109*b*, RIGHT key 109*c*, and shutter key 110, it is possible to zoom up/down a shot image, temporarily store image data or store image data, register a standby display screen, and transmit electronic mails. The CENTER key 109*a* is provided slightly closer to the free end 25 of the first movable part 12 than the LEFT key 109*b* and the RIGHT key 109*c*. When the CENTER key 109*a* is operated, this prevents the fingers of the operator from undesirably coming in contact with the LEFT key 109*b* and the RIGHT key 109*c*. The back keys 109*a*, 109*b*, 109*c* correspond to function setting operation buttons.

On the second movable part 13, an imaging section 18 and an antenna 19 are provided at the back of the inner operation section 14. The imaging section 18 is provided, while externally oriented, in an area exposed to the outside in a closed condition where the first and second movable parts 12, 13 fold closed, that is, in an area other than the areas where the first and second movable parts 12, 13 are opposed in a closed condition. The imaging section 18 is provided close to the hinge 23 of the second movable part 13, facing the side opposite to the display face of the outer display 16 in a closed condition. That is, the imaging lens 18 of the imaging section 18 is provided facing the side opposite to the inner operation section 14.

A shutter key 110 is provided on one side of the second movable part 13 in this embodiment. The shutter key 110 may be provided on one side of the first movable part 12 in another embodiment of the invention. By providing the shutter key 110 on one side of the portable information processing apparatus 100, it is possible to take a picture while holding the portable information processing apparatus 100 in a closed condition, one side facing upward and the other side facing downward. This enhances the operability.

In close proximity to the imaging section 18 is provided a light-emitting section 201. The light-emitting section 201 facing the side opposite to the display face of the outer display 16 emits a light in the closed condition to illuminate the area shot with the imaging section 18. In the other side of the second movable part 13 is formed a detachable memory slot 202 for attaching a detachable memory.

Operation keys 14*a* in the inner operation section 14 includes for example at least a LEFT key 129, a RIGHT key 130, an F key 131, a mail key 133, a camera key 134, a power key 135 and a clear key 136. The LEFT key 129, the RIGHT key 130, the F key 131, the mail key 133, the camera key 134, the power key 135 and the clear key 136 are provided close to the hinge 23 of the second movable part 13. On the left of the F key 131 is provided the LEFT key 129. On the right of the F key 131 is provided the RIGHT key 130.

Figure 16:
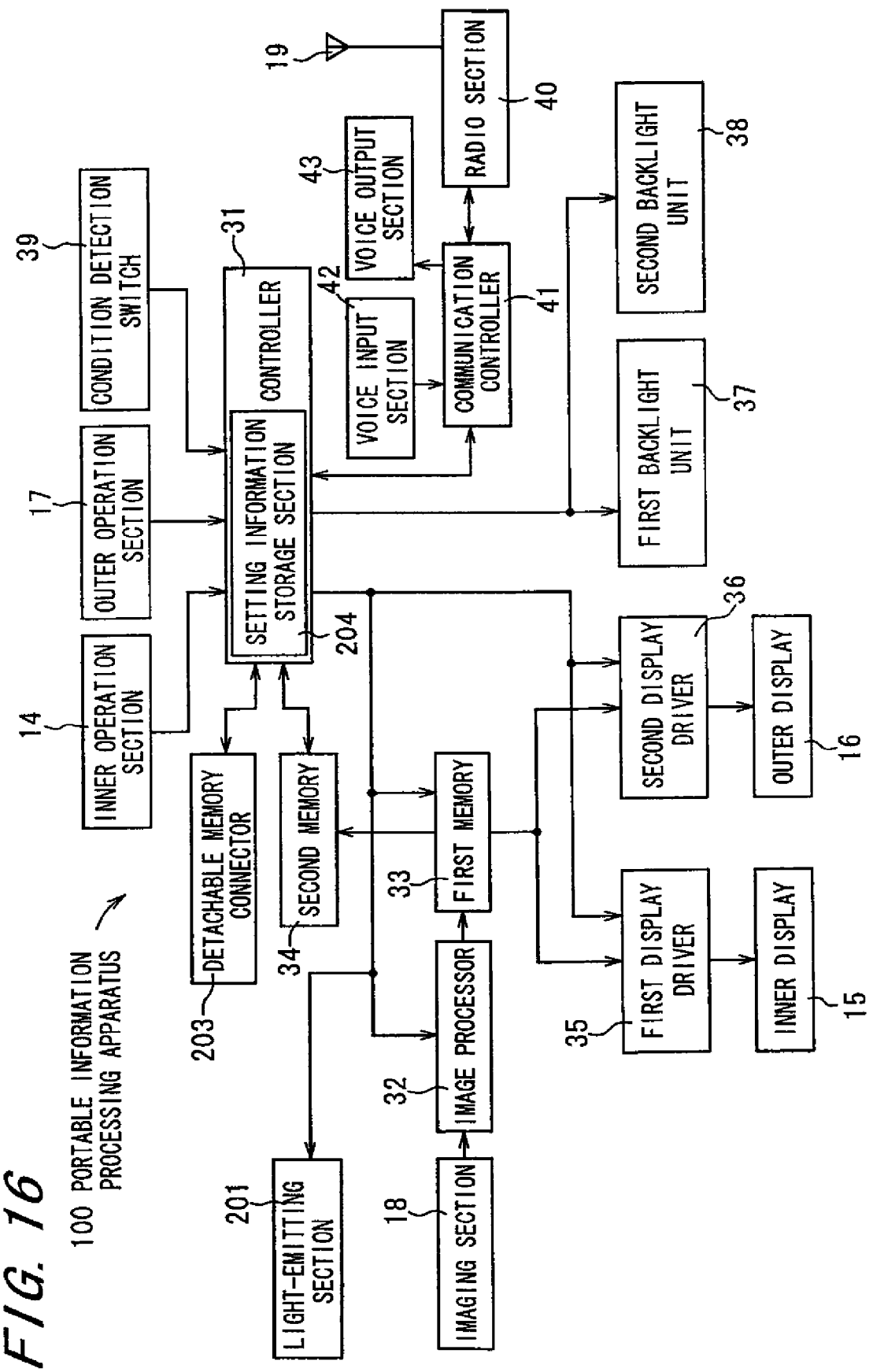
FIG. 16 is a block diagram showing the electrical configuration of the portable information processing apparatus.

FIG. 16 is a block diagram showing the electrical configuration of the portable information processing apparatus 100. The portable information processing apparatus 100 comprises a light-emitting section 201 and a detachable memory connector 203 as well as the aforementioned first and second movable parts 12, 13, the inner operation section 14, the inner display 15, the outer display 16, the outer operation section 17, the imaging section 18, the antenna 19, a controller 31, the image processor 32, the first memory 33, the second memory 34, the first display driver 35, the second display driver 36, the first backlight unit 37, the second backlight unit 38, the condition detecting switch 39, the radio section 40, the communication controller 41, the voice input section 42 and the voice output section 43.

The light-emitting section 201 emits a light based on a control signal supplied by the controller 31. The light-emitting section 201 is a light which helps photographing when the surrounding is dark. Thereafter, there is a case where the light-emitting section 201 is called a picture light. The light-emitting section 201 is implemented for example by a Light Emitting Diode (LED).

The detachable memory connector 203 is an interface for attaching a detachable memory in a detachable fashion. The detachable memory is implemented for example by a nonvolatile recording medium such as a semiconductor memory. The semiconductor memory is for example a flash memory. The detachable memory connector 203 is electrically connected to the controller 31. The controller 31 stores predetermined information including for example image data obtained through the imaging section 18 into a detachable memory attached to the detachable memory connector 203. Or, the controller 31 reads predetermined information from the detachable memory 18. The detachable memory inserted into the detachable memory slot 202 is attached to the detachable memory connector 203 in a detachable fashion in relation to each other.

By storing the image shot into a detachable memory connected to the detachable memory connector 203, it is readily possible to increment the image data items to be stored and transfer image data to another unit via a detachable memory, which enhances the convenience.

The controller 31 has a setting information storage section 204 implemented for example by a nonvolatile storage medium such as a flash memory. Into the setting information storage section 204 is stored information on the setting of portable information processing apparatus such as information on the magnification of photographing, a standby screen, and a location for storing shot images.

FIG. 17 through FIG. 22 are flowcharts showing the operation on photographing of the portable information processing apparatus 100. The outer display 16 is represented as a sub-LCD in FIG. 17 and FIG. 21 and the inner display 15 is represented as a main LCD in FIG. 19 and FIG. 22. Operation shown in the flowchart of FIG. 17 through FIG. 22 is executed based on a program previously stored in the processor 31. The program is executed by a central processing unit (CPU).

Figure 17:
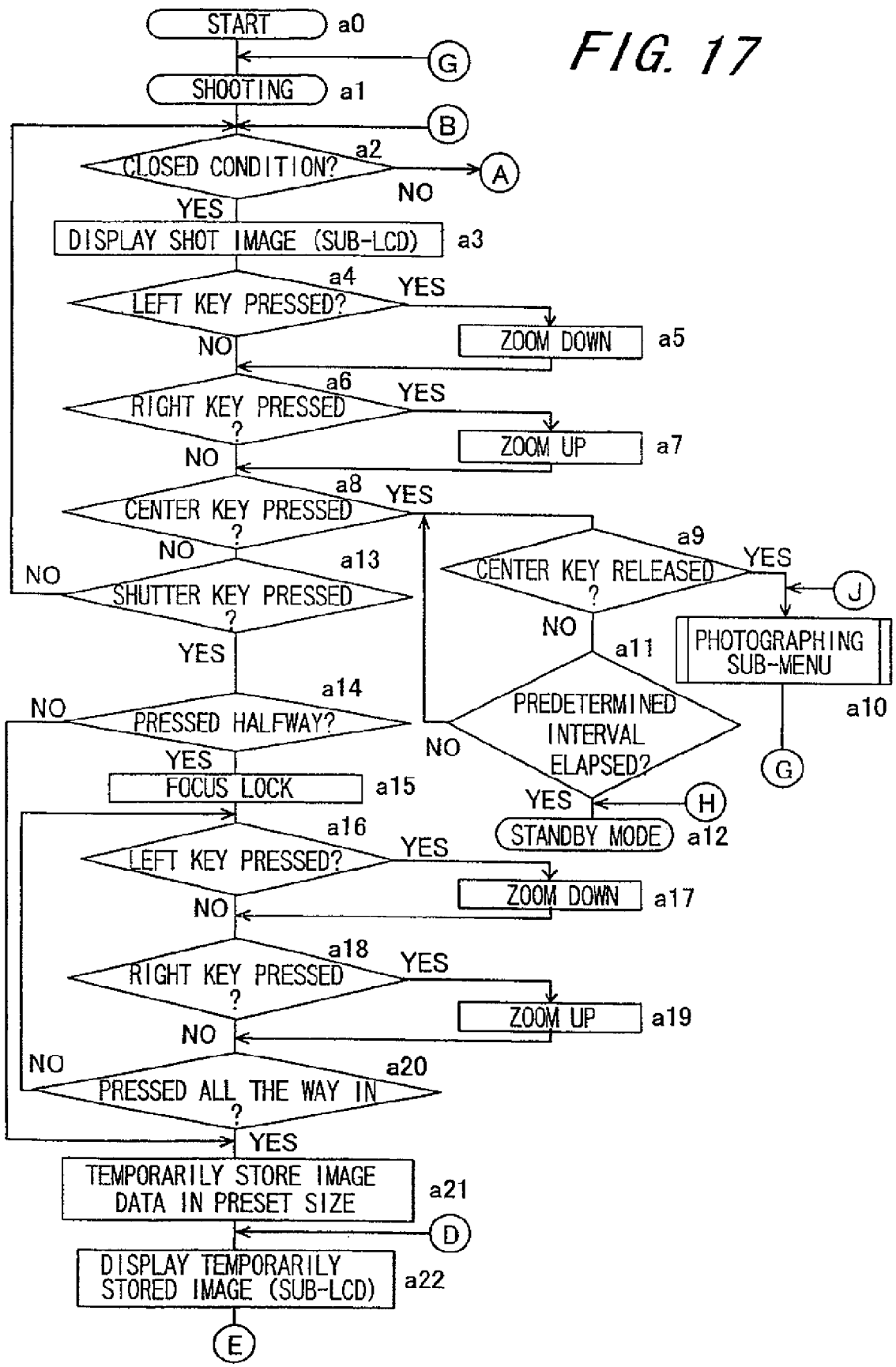
FIG. 17 is a flowchart showing the operation on photographing of the portable information processing apparatus.

When the operator operates the shutter key 110 for a predetermined interval of time, to be specific, presses the shutter key 110 for two seconds in a standby mode awaiting a call or an electronic mail, execution proceeds from step a0 to step a1 in the flowchart of FIG. 17.

In step a1, the controller 31 places the portable information processing apparatus 100 into a camera mode or shooting mode. The controller 31 starts the imaging section 18 and supplies a control signal to an image processor 32 and a first memory 32 to start photographing with the imaging section 18. When the processing in step a1 is complete, execution proceeds to step a2.

In step a2, the controller 31 determines whether the portable information processing apparatus is in a closed condition based on the state of a condition detecting switch 39. In case it is determined that the portable information processing apparatus is in a closed condition, execution proceeds to step a3. The controller 31 displays an image obtained through the imaging section 18 on the outer display 16. Hereinafter, an image obtained through the imaging section 18 is also refereed to as a shot image.

Figure 23:
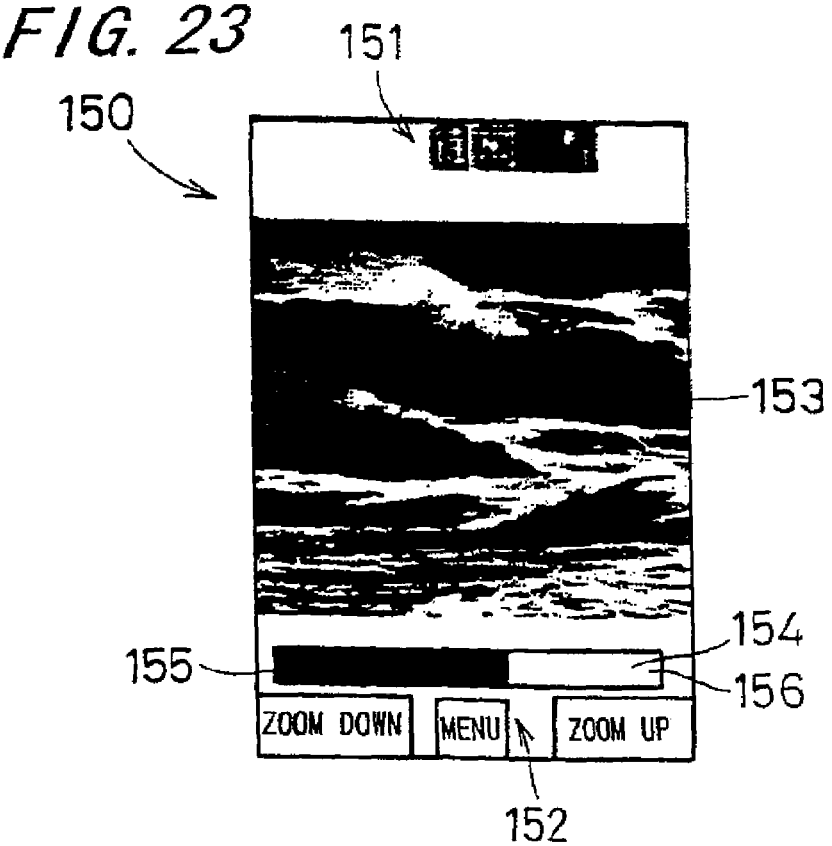
FIG. 23 shows a display screen of the outer display in a camera mode.

FIG. 23 shows a display screen 150 of the outer display 16 in a camera mode. FIG. 23 shows the display screen 150 in the initial setting or default state. Below the display screen 150 shown in FIG. 23 are provided the back keys 109a, 109b, 109c. In an end area of the display screen 150 close to the hinge 23 is provided a condition display area 151 for displaying the condition of the portable information processing apparatus 100. In the condition display area 151 is shown the condition of the portable information processing apparatus 100 by way of predetermined images and symbols. An image or a symbol to represent the condition of the portable information processing apparatus 100 is also referred to as a pictogram. The pictogram represents for example magnification of photographing or a location where a shot image is stored.

In the bottom area of the display screen 150, that is, in the end area close to the back keys 109 is displayed an operation key description area 152 including the description on the LEFT key 109b, the RIGHT key 109c and the CENTER key 109a which belong to the back keys 109. In the operation key description area 152 are displayed the characters "Zoom Down", "Zoom Up", and "Menu". The "Zoom Down" is displayed in close proximity to the LEFT key 109b. "Zoom Up" is displayed in close proximity to the RIGHT key 109c. "Menu" is displayed in close proximity to the CENTER key 109a. In this way, corresponding characters are displayed in the display area of the outer display 16 in close proximity to each key. Thus the operator can operate a desired key while checking the characters displayed. In this embodiment, a shot image display area 153 is provided in an area between the condition display area 151 and the operation key description area 152. The controller 31 displays a shot image shot with the imaging section 18 in the shot image display area 153. The shot image displayed in the shot image display area 153 is updated at predetermined intervals based on the image data supplied from the imaging section 18.

In the shot image display area 153, a photographing magnification display bar 154 to show the current magnification of photographing is displayed close to the operation key description area 152. The photographing magnification display bar 154 extends in parallel with one side 112 of the rectangular display area, that is, in parallel with the lateral direction in FIG. 23. For example, one end 155 of the photographing magnification display bar 154 is associated with the minimum magnification of photographing and the other end 156 with the maximum magnification of photographing. Then, the area from one end or the other end to the section is displayed for example in a color different from that of the other areas as shown in FIG. 23. This allows the operator to immediately understand the current magnification of photographing.

In step a3, the controller 31 sets the LEFT key 109b and the RIGHT key 109c to the command input function to input a command to modify the magnification of photographing as a function on photographing, while displaying the image shot with the imaging section 18 on the outer display 16.

Execution then proceeds to step a4. The controller 31 determines whether the operator has operated the LEFT key 109b used by the operator to enter a Zoom Down command. In case it is determined that the LEFT key 109b has been operated, execution proceeds to step a5. In case it is determined that the LEFT key 109b has not been operated, execution proceeds to step a6.

In step a5, the controller 31 displays in zoom down fashion part of the shot image shot with the imaging section 18 on the outer display 16. That is, the controller 31 decreases the magnification of photographing. On the portable information processing apparatus 100, the operator can zoom down a shot image in steps each time he/she operates the LEFT key 109b. The operator can hold down the LEFT key 109b to continuously zoom down the shot image. When the operator holds down the LEFT key 109b for a predetermined interval of time (for example about two seconds), the controller 31 determines that the LEFT key 109b has been held down. The predetermined interval of time is not limited to two seconds.

When the processing in step a5 is complete, execution proceeds to step a6. In step a6, the controller 31 determines whether the operator has operated the RIGHT key 109c corresponding to Zoom Up function. In case it is determined that the RIGHT key 109c has been operated, execution proceeds to step a7. In case it is determined that the RIGHT key 109c has not been operated, execution proceeds to step a8.

In step a7, the controller 31 displays in zoom up fashion part of the shot image shot with the imaging section 18 on the outer display 16. That is, the controller 31 increases the magnification of photographing. On the portable information processing apparatus 100, the operator can zoom up a shot image in steps each time he/she operates the RIGHT key 109c. The operator can hold down the RIGHT key 109c to continuously zoom up the shot image. When the operator holds down the RIGHT key 109c for a predetermined interval of time (for example about two seconds), the controller 31 determines that the RIGHT key 109c has been held down. The predetermined interval of time is not limited to two seconds.

When the processing in step a7 is complete, execution proceeds to step a8. In step a8, the controller 31 determines whether the operator has operated the CENTER key 109a used by the operator to display a menu on the outer display 16. In case it is determined that the CENTER key 109a has been operated, execution proceeds to step a9. In step a9, the controller 31 determines whether the CENTER key 109a has been released. In other words, the controller 31 determines whether the operator has canceled the operation of the CENTER key 109a. In case it is determined that the CENTER key 109a has been released, execution proceeds to step a10 (a subroutine in FIG. 21). When the processing in step a10 is complete, execution proceeds to step a1.

In case the processor 31 determines that the CENTER key 109a has not been released in step a9, execution proceeds to step a11. The controller 31 determines whether a predetermined interval of time (for example about five seconds) has elapsed in step a11. The predetermined interval of time is not limited to five seconds. In case it is determined that the predetermined interval of time has not elapsed, execution proceeds to step a9. In case it is determined that the predetermined interval of time has elapsed, execution proceeds to step a12, where the portable information processing apparatus 100 is placed into the standby mode awaiting a call or an electronic mail.

In case the controller 31 determines that the RIGHT key 109a has not been operated in step a8, execution proceeds to step a13. In step a13, the controller 31 determines whether the operator has operated the shutter key 110. In case it is determined that the shutter key 110 has not been operated, execution proceeds to step a2. In case it is determined that that the shutter key 110 has been operated, execution proceeds to step a14.

In step a14, the controller 31 determines whether the operator has pressed the shutter 110 halfway. The "halfway" refers to a condition where the shutter key 110 is pressed half the amount of the full travel of the operation piece, or the shutter key 110 is pressed once. In this embodiment, the condition where the shutter key 110 is pressed half the amount of the full travel of the operation piece is defined as pressing halfway.

In step a14, in case the controller 31 determines that the shutter key 110 has been pressed halfway, execution proceeds to step a15. In step a15, the controller 31 displays a focus-locked image on the outer display 16.

Figure 24:
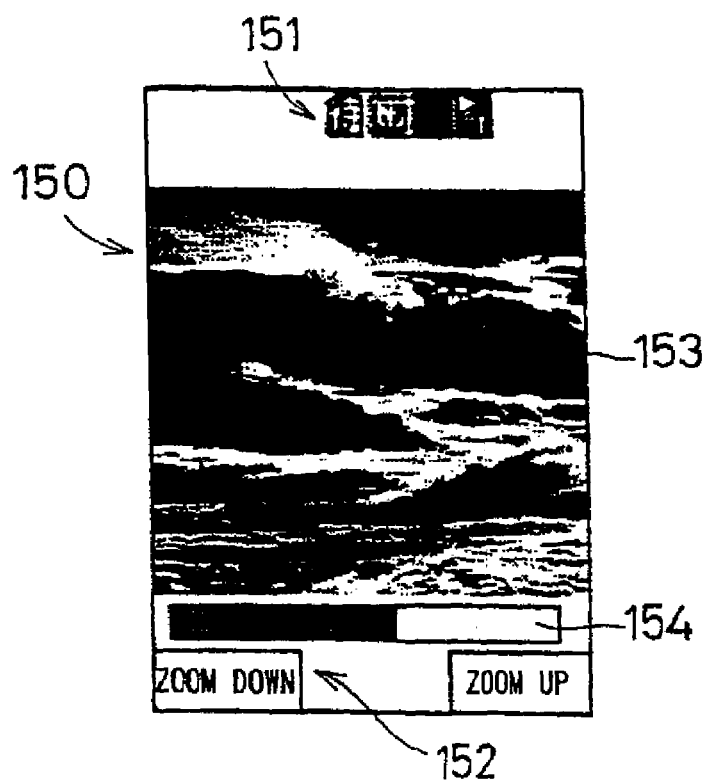
FIG. 24 shows the display screen of the outer display assumed after the focus is locked.

FIG. 24 shows the display screen 150 of the outer display 16 assumed after the focus is locked. With a focus lock, an image shot with the imaging section 18 is displayed on the outer display 16. In the operation key description area 152 of the display screen 150 are displayed the characters "Zoom Down" and "Zoom Up". The "Zoom Down" is displayed in close proximity to the LEFT key 109b. "Zoom Up" is displayed in close proximity to the RIGHT key 109c. The image displayed in the shot image display area 153 is a image displayed on the outer display 16 when the shutter key 110 is pressed. From now on, image data supplied from the imaging section 18 will not be displayed on the outer display 16.

Execution then proceeds to step a16. The controller 31 determines whether the operator has operated the LEFT key 109b used by the operator to enter a Zoom Down command. In case it is determined that the LEFT key 109b has been operated, execution proceeds to step a17. In case it is determined that the LEFT key 109b has not been operated, execution proceeds to step a18.

In step a17, the controller 31 displays on the outer display 16 in zoom down fashion part of the shot image displayed on the outer display 16. That is, the controller 31 decreases the magnification of photographing. On the portable information processing apparatus 100, the operator can zoom down a shot image in steps each time he/she operates the LEFT key 109b. The operator can hold down the LEFT key 109b to continuously zoom down the shot image. When the operator holds down the LEFT key 109b for a predetermined interval of time (for example about two seconds), the controller 31 determines that the LEFT key 109b has been held down. The predetermined interval of time is not limited to two seconds.

When the processing in step a17 is complete, execution proceeds to step a18. In step a18, the controller 31 determines whether the operator has operated the RIGHT key 109c used by the operator to enter a Zoom Up command. In case it is determined that the RIGHT key 109c has been operated, execution proceeds to step a19. In case it is determined that the RIGHT key 109c has not been operated, execution proceeds to step a20.

In step a19, the controller 31 displays on the outer display 16 in zoom up fashion part of the shot image displayed on the outer display 16. That is, the controller 31 increases the magnification of photographing. On the portable information processing apparatus 100, the operator can zoom up a shot image in steps each time he/she operates the RIGHT key 109c. The operator can hold down the RIGHT key 109c to continuously zoom up the shot image. When the operator holds down the RIGHT key 109c for a predetermined interval of time (for example about two seconds), the controller 31 determines that the RIGHT key 109c has been held down. The predetermined interval of time is not limited to two seconds.

When the processing in step a19 is complete, execution proceeds to step a20. In step a20, the controller 31 determines whether the operator has pressed the shutter 110 all the way in. The "all the way in" refers to a condition where the shutter key 110 is pressed all the amount of the full travel of the operation piece, or the shutter key 110 is pressed twice. In this embodiment, the condition where the shutter key 110 is pressed all the amount of the full travel of the operation piece is defined as pressing all the way in.

In step a20, in case the controller 31 determines that the shutter key 110 has been pressed all the way in, execution proceeds to step a21. In step a20, in case the controller 31 determines that the shutter key 110 has not been pressed all the way in, execution proceeds to step a16. In step a14, in case the controller 31 determines that the shutter key 110 has not been pressed halfway, execution proceeds to step a21.

In step a21, the controller 31 temporarily stores image data obtained through the imaging section 18 in a preset size into the first memory 33. Information on the size of the image data is previously stored in the setting information storage section 204 of the controller 31.

In this way, it is possible to readily modify the magnification of photographing by simply operating the LEFT key 109b or RIGHT key 109c so that the operability of photographing is enhanced. The magnification of photographing can be modified after focus lock. Thus, the magnification of photographing of an image shot under a preset magnification can be readily modified thereby enhancing the freedom of photographing.

When the processing in step a21 is complete, execution proceeds to step a22. In step a22, the controller 31 displays the shot image temporarily stored in step a21 on the outer display 16.

Figure 25:
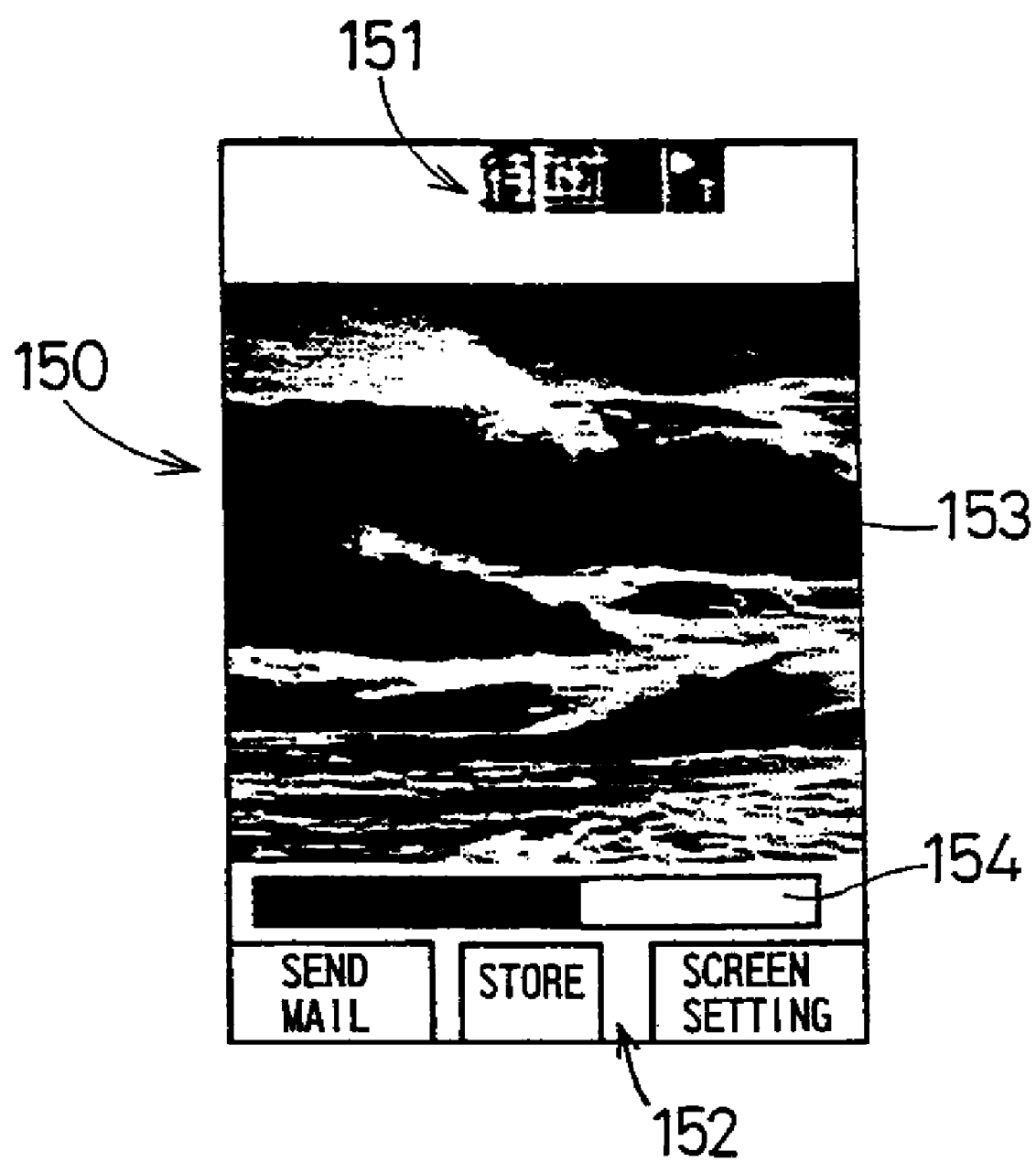
FIG. 25 shows the display screen of the outer display assumed after a temporarily stored shot image is displayed.

FIG. 25 shows the display screen 150 of the outer display 16 assumed after a temporarily stored shot image is displayed. By way of the processing in step a21, the image which is based on the temporarily stored image data is displayed on the display screen 150 of the outer display 16. In the operation key description area 152 are displayed the characters "Send Mail", "Store", and "Screen Setting". The "Send Mail" is displayed in close proximity to the LEFT key 109b. "Store" is displayed in close proximity to the CENTER key 109a. "Screen Setting" is displayed in close proximity to the RIGHT key 109c.

Figure 18:
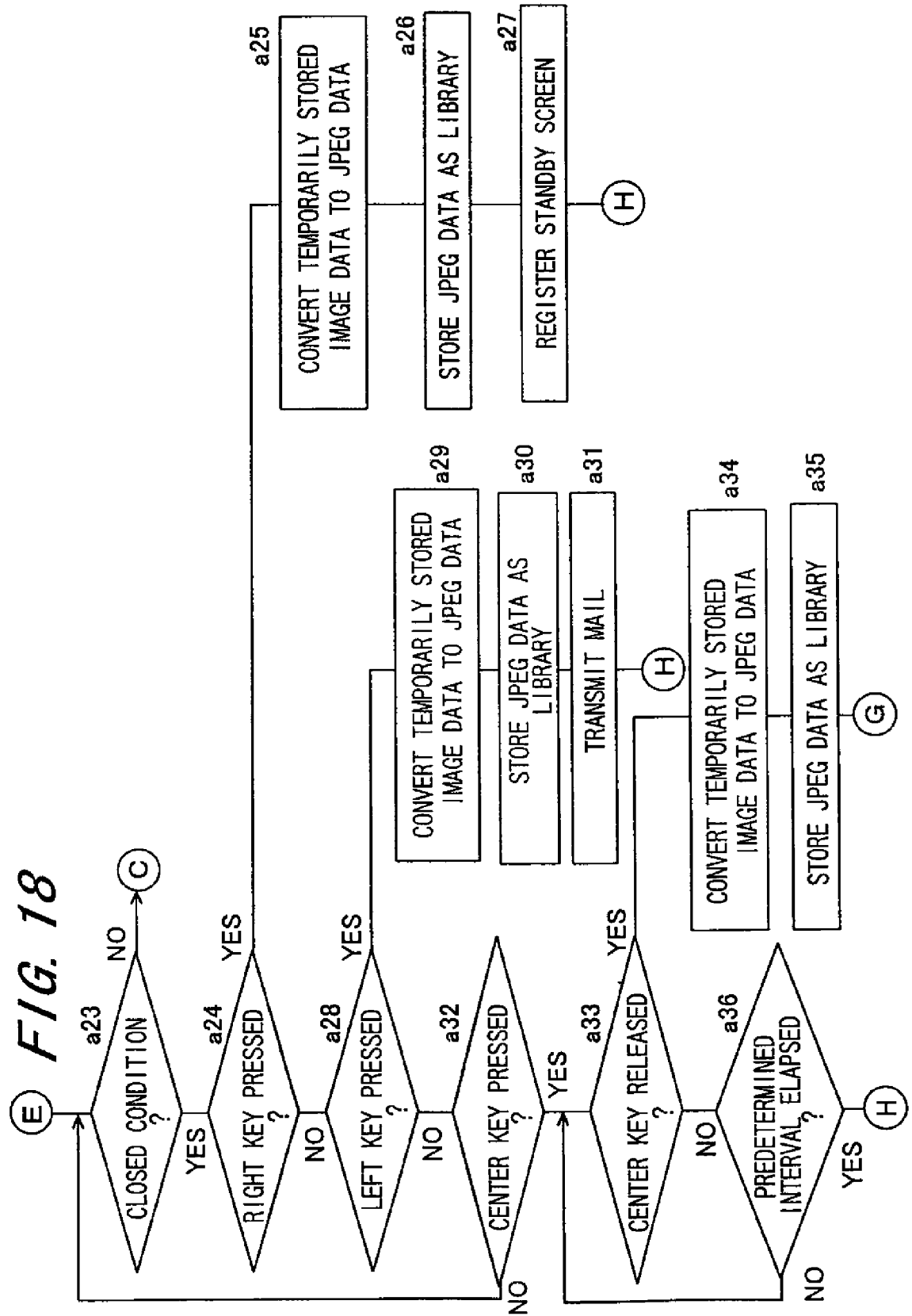
FIG. 18 is a flowchart showing the operation on photographing of the portable information processing apparatus.

When the processing in step a22 is complete, execution proceeds to step a23 shown in FIG. 18. In step a23, the controller 31 determines whether the portable information processing apparatus 100 is in a closed condition based on the state of the condition detecting switch 39. In case it is determined that the portable information processing apparatus is not in a closed condition, execution proceeds to step a49 shown in FIG. 19. In step a23, in case it is determined that the portable information processing apparatus 100 is in a closed condition, execution proceeds to step a24. In step a24, the controller 31 determines whether the RIGHT key 109c has been operated. In step a24, the RIGHT key 109c serves as a standby display screen registration key.

In step a24, in case it is determined that that RIGHT key 109c has been operated, execution proceeds to step a25. The controller 31 compresses the image data temporarily stored in the step a21 by way of a predetermined compression method. In this embodiment, JPEG (Japanese Photographic. Experts Group) is used as the compression method to convert the temporarily stored image data to JPEG data. The step of converting to JPEG data is the same as the step of fixing the compression ratio based on the image data size obtained through the imaging section 18 and the send data size which can be transmitted by the communication section 40 and using the compression ratio to convert the temporarily stored image data to JPEG data.

Next, execution proceeds to step a26. The controller 31 stores as a library the JPEG data obtained by the processing in step a25 for example into the second memory 34 or detachable memory based on the setting information stored in the setting information storage section 204. Execution then proceeds to step a27, where a standby display screen on the inner display 15, that is, a standby image is registered, then execution proceeds to step a12 in FIG. 17. In a closed condition and in a standby mode, the controller 31 displays the image registered as a shot standby image on the outer display 16. The controller 31 has a setting information storage section 204 implemented for example by a nonvolatile memory such as a flash memory and stores the information on the image registered as a standby image into the setting information storage section 204.

In case the controller 31 determines that the RIGHT key 109c has not been operated in step a24, execution proceeds to step a28. In step a28, the controller 31 determines whether the operator has operated the LEFT key 109b. In step a28, the LEFT key 109b corresponds to a JPEG data storage key and a main send key. In case it is determined that the LEFT key 109b has been operated, execution proceeds to step a29. The controller 31 converts the image data temporarily stored in step a21 to for example JPEG data. Execution then proceeds to step a23. The controller 31 stores as a library the JPEG data obtained by the processing in step a23 for example into the second memory 34 or detachable memory based on the setting information stored in the setting information storage section 204. Execution then proceeds to step a31, where the image data stored in the second memory 34 in step a23 is attached to an electronic mail and transmitted to a predetermined destination. Execution then proceeds to step a12 in the flowchart of FIG. 17. The predetermined destination is stored in the setting information storage section 204. The operator can use the inner operation section 14 to register the predetermined destination to the setting information storage section 204. In this way, with simple operation of the RIGHT key 109c, it is possible to transmit a shot image to a predetermined destination, thereby enhancing the scope of use of the shot image.

In case the controller 31 determines that the RIGHT key 109a has not been operated in step a28, execution proceeds to step a32. In step a32, the controller 31 determines whether the operator has operated the CENTER key 109a. In step a32, the CENTER key 109a corresponds to a JPEG data storage key and a return to photographing key. In case it is determined that the CENTER key 109a has not been operated, execution proceeds to step a23. In case it is determined that the CENTER key 109a has been operated in step a32, execution proceeds to step a33. In step a33, the controller 31 determines whether the CENTER key 109a has been released. In case the controller 31 determines that the operator has released the CENTER key 109a, execution proceeds to step a34.

In step a34, the image data temporarily stored in step a21 is converted to for example JPEG data. Execution then proceeds to step a35. The controller 31 stores as a library the JPEG data obtained in step a34 for example into the second memory 34 or detachable memory based on the setting information stored in the setting information storage section 204. When the processing of step a35 is complete, execution proceeds to step a1 in the flowchart of FIG. 17.

In case the processor 31 determines that the CENTER key 109a has not been released in step a33, execution proceeds to step a36. The controller 31 determines whether a predetermined interval of time has elapsed in step a36. The predetermined interval of time is for example about five seconds although it is not limited to five seconds. In case it is determined that the predetermined interval of time has not elapsed, execution returns to step a33. In step a36, in case it is determined that the predetermined interval of time has elapsed, execution proceeds to step a12 in the flowchart of FIG. 17.

Figure 19:
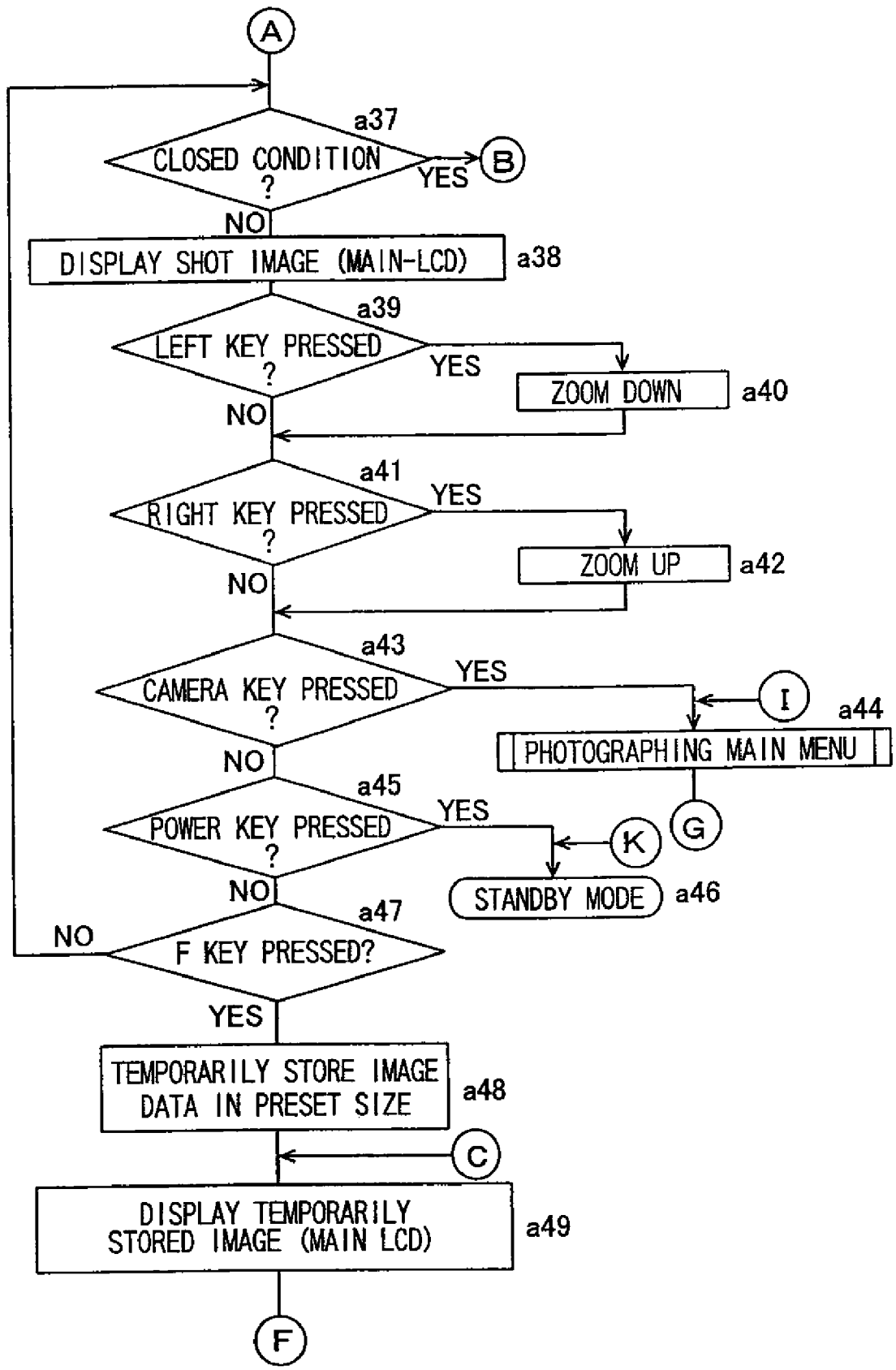
FIG. 19 is a flowchart showing the operation on photographing of the portable information processing apparatus.

In case it is determined that the portable information processing apparatus 100 is not in a closed condition in step a2 in the flowchart of FIG. 17, execution proceeds to step a37 in the flowchart of FIG. 19. Here, the controller 31 determines whether the portable information processing apparatus 100 is in a closed condition again. In case it is determined that the portable information processing apparatus 100 is in a closed condition in step a37, execution proceeds to step a2 in the flowchart of FIG. 17. In case the controller 31 determines that the portable information processing apparatus 100 is not in a closed condition, that is, the portable information processing apparatus 100 is in an open condition, execution proceeds to step a38.

In the step a38, the controller 31 displays a shot image on the inner display 15. Execution then proceeds to step a39. The controller 31 determines whether the operator has operated a LEFT key 129 included in the operation key 14a used by the operator to enter a Zoom Down command. In case it is determined that the LEFT key 129 has been operated, execution proceeds to step a40. The controller 31 displays in zoom down fashion a shot image, or a reduced shot image on the inner display 15.

Execution then proceeds to step a41. The controller 31 determines whether the operator has operated the RIGHT key 130 used by the operator to enter a Zoom UP command. In case it is determined that the RIGHT key 130 has been operated, execution proceeds to step a42. The controller 31 displays in zoom up fashion a shot image on the inner display 15. Execution then proceeds to step a43. The controller 31 determines whether the operator has operated a camera key 134 (see FIG. 13) included in the operation key 14a. In case it is determined by the controller 31 that the camera key 134 has been operated, execution proceeds to step a44 (a subroutine in FIG. 22).

In case the controller 31 determines that the camera key 134 has not been operated in step a43, execution proceeds to step a45. In step a45, the controller 31 determines whether the operator has operated a power key 135 included in the operation key 14a. In case the controller 31 determines that the power key 135 has been operated, execution proceeds to step a46. In step a46, the portable information processing apparatus 100 is placed in a standby mode awaiting a call or an electronic mail.

In case the controller 31 determines that the power 135 has not been operated in step a45, execution proceeds to step a47. In step a47, the controller 31 determines whether the operator has operated an F key 131 included in the operation key 14a. In case the controller 31 determines that the F key 131 has not been operated, execution proceeds to step a37. In case the controller 31 determines that the F key 131 has been operated, execution proceeds to step a48.

In step a48, the controller 31 temporarily stores image data generated in a preset size into the first memory 33. Execution then proceeds to step a49. The controller 31 displays the temporarily stored shot image on the inner display 15.

Figure 20:
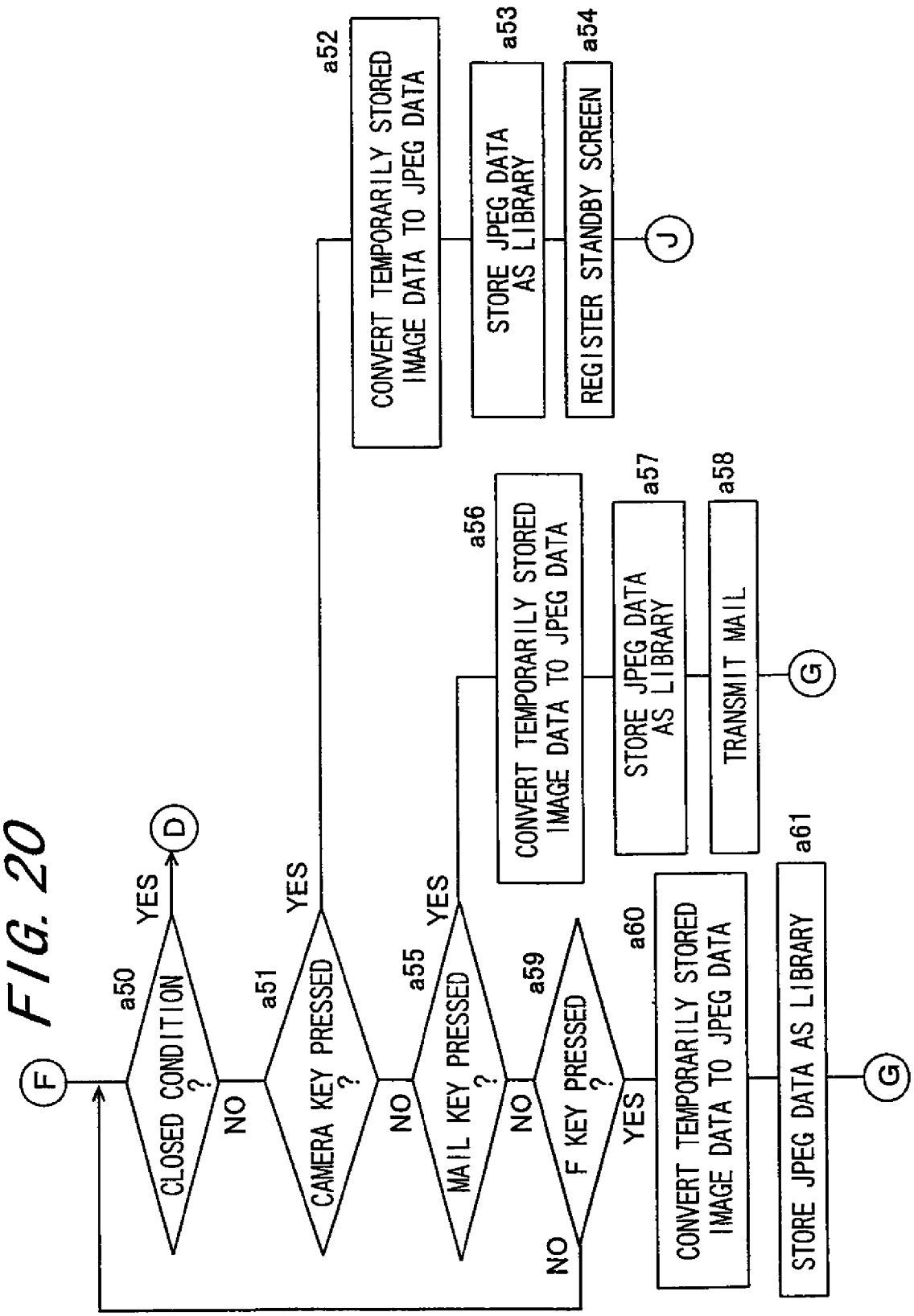
FIG. 20 is a flowchart showing the operation on photographing of the portable information processing apparatus.

Execution then proceeds to step a50 shown in FIG. 20. The controller 31 determines whether the portable information processing apparatus 100 is in a closed condition based on the state of a condition detecting switch 39. In case it is determined that the portable information processing apparatus 100 is in a closed condition, execution proceeds to step a22 in the flowchart of FIG. 17. In case it is determined that the portable information processing apparatus 100 is not in a closed condition, execution proceeds to step a51. In step a51, the controller 31 determines whether the operator has operated a camera key 134.

In case it is determined that the camera key 134 has been operated, execution proceeds to step s52. The controller 31 converts the image data temporarily stored in step a48 to for example JPEG data. Execution then proceeds to step a53. The controller 31 stores as a library the JPEG data obtained in step a52 for example into the second memory 34 or detachable memory based on the setting information stored in the setting information storage section 204. Execution then proceeds to step a54. The standby display screen on the outer display 16, that is, a standby image is registered, then execution proceeds to step a46 in the flowchart of FIG. 19. In an open condition and in a standby mode, the controller 31 displays the image registered as a shot standby image on the inner display 15. The information on the image registered as a standby image is stored into the setting information storage section 204.

In step a51, in case the controller 31 determines that the camera key 134 has not been operated, execution proceeds to step a55. In step a55, the controller 31 determines whether the operator has operated a mail key 133 included in the key operation section 14a. The mail key 133 corresponds to a JPEG data storage key and a mail transmission shift key. In case it is determined that the mail key 133 has been operated in step s48, execution proceeds to step a56. The controller 31 converts the image data temporarily stored in step a48 to for example JPEG data. Execution then proceeds to step a57. The controller 31 stores as a library the JPEG data obtained in step a56 for example into the second memory 34 or detachable memory based on the setting information stored in the setting information storage section 204. Execution then proceeds to step a58, where the image data stored in the second memory 34 in step a57 is attached to an electronic mail and transmitted to a predetermined destination. Execution then proceeds to step a1 in the flowchart of FIG. 17.

In case the controller 31 determines that the mail key 133 has not been operated in step a55, execution proceeds to step a59. The controller 31 determines whether the operator has operated an F key 131. The F key 131 corresponds to a JPEG data storage key and a return to photographing key. In case it is determined that the F key 131 has not been operated, execution proceeds to step a50. In case it is determined that the F key 131 has been operated in step a59, execution proceeds to step a60. In step a60, the controller 31 converts the image data temporarily stored in step a48 to for example JPEG data. Execution then proceeds to step a61. The controller 31 stores as a library the JPEG data obtained in step a60 for example into the second memory 34 or detachable memory based on the setting information stored in the setting information storage section 204. Execution then proceeds to step a1 in the flowchart of FIG. 17.

Figure 21:
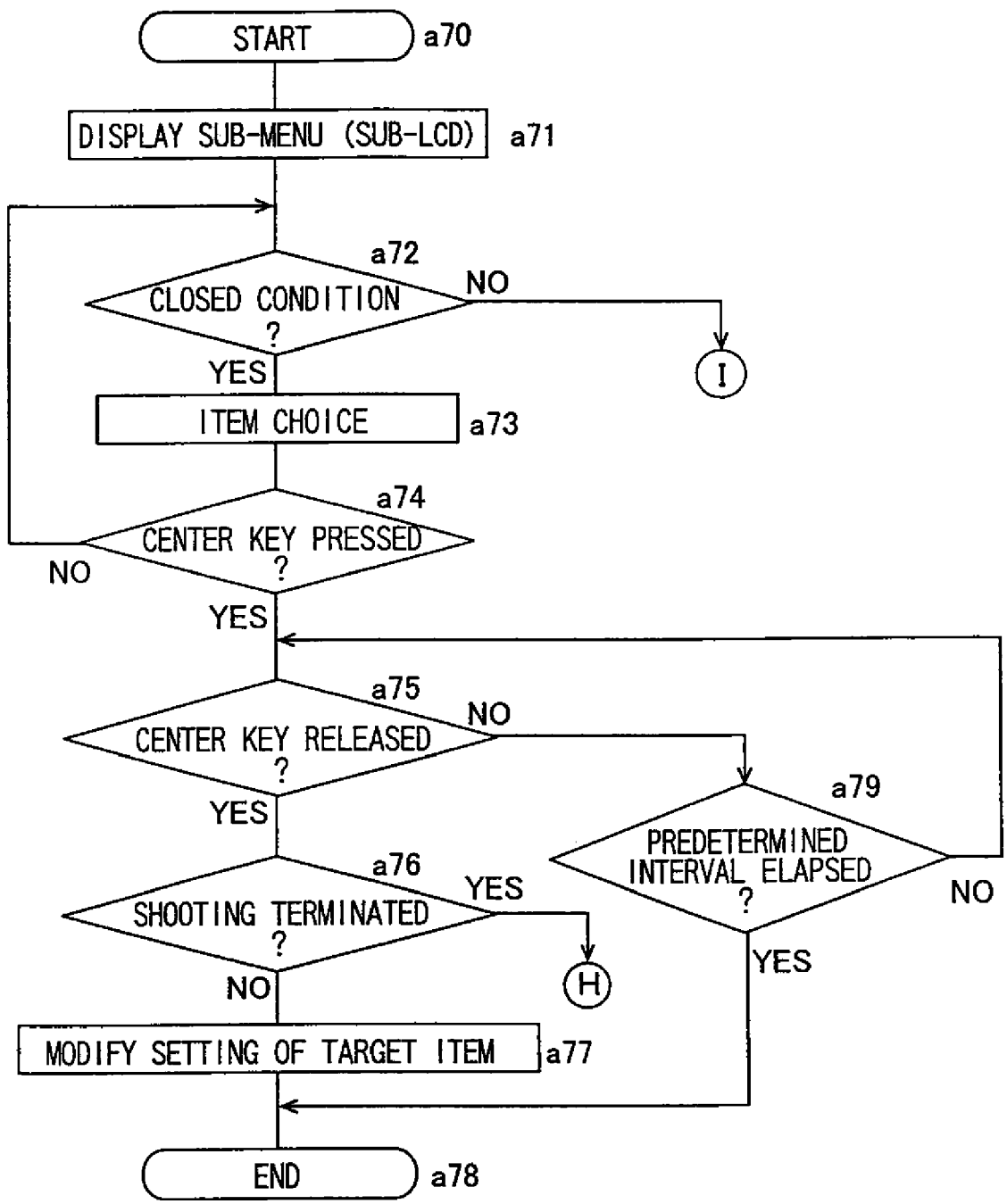
FIG. 21 is a flowchart showing the operation on photographing of the portable information processing apparatus.

FIG. 21 is a flowchart showing a subroutine of a photographing sub-menu in step a10 in FIG. 17. When execution proceeds from step a9 to a photographing sub-menu in step a10 in the flowchart shown in FIG. 19, execution proceeds to step a70 through step a71. In step a71, the controller 31 displays a sub-menu 301 on the outer display 16.

Figure 26:
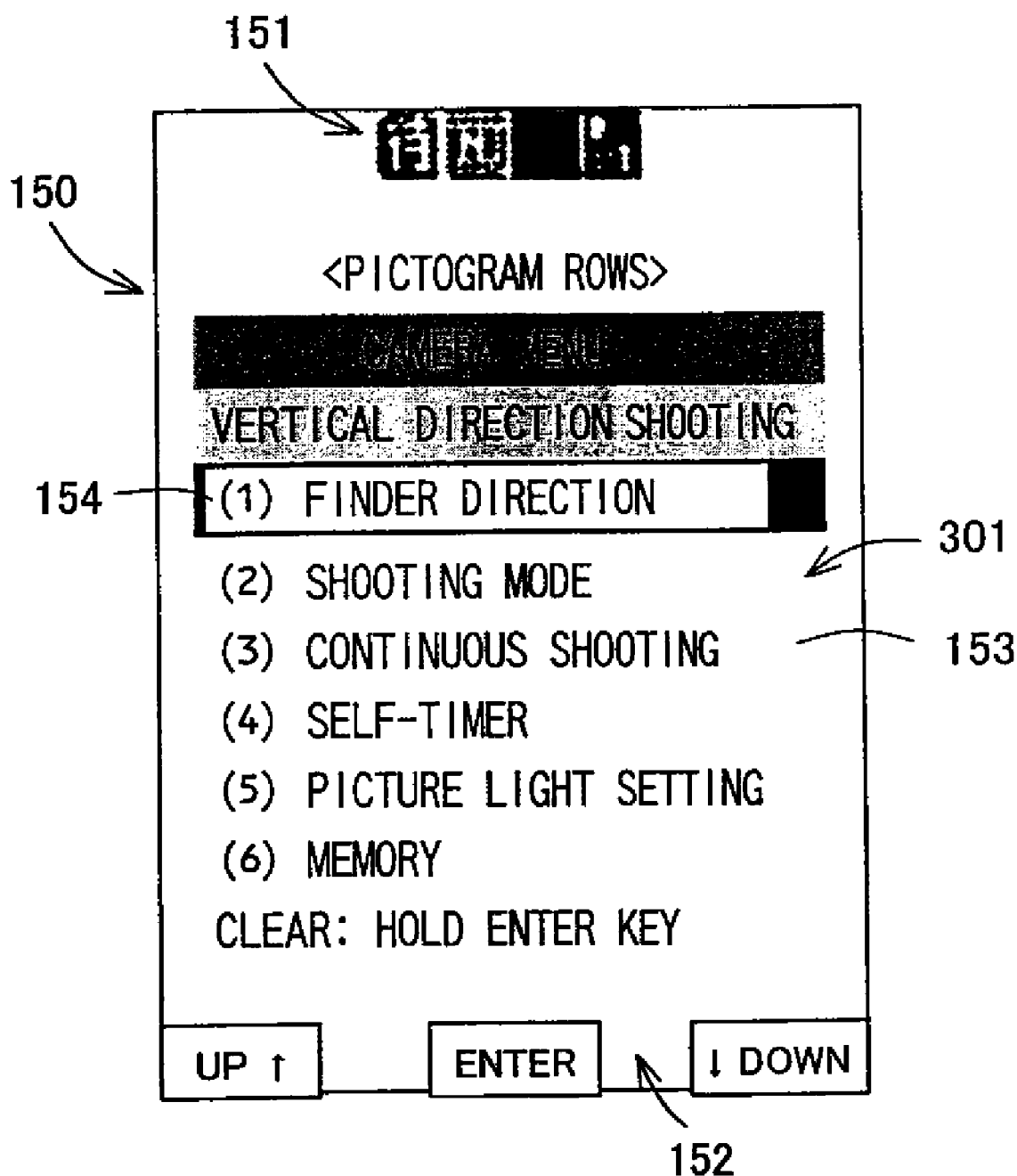
FIG. 26 shows the display screen of the outer display with a sub-menu being displayed.
Figure 27:
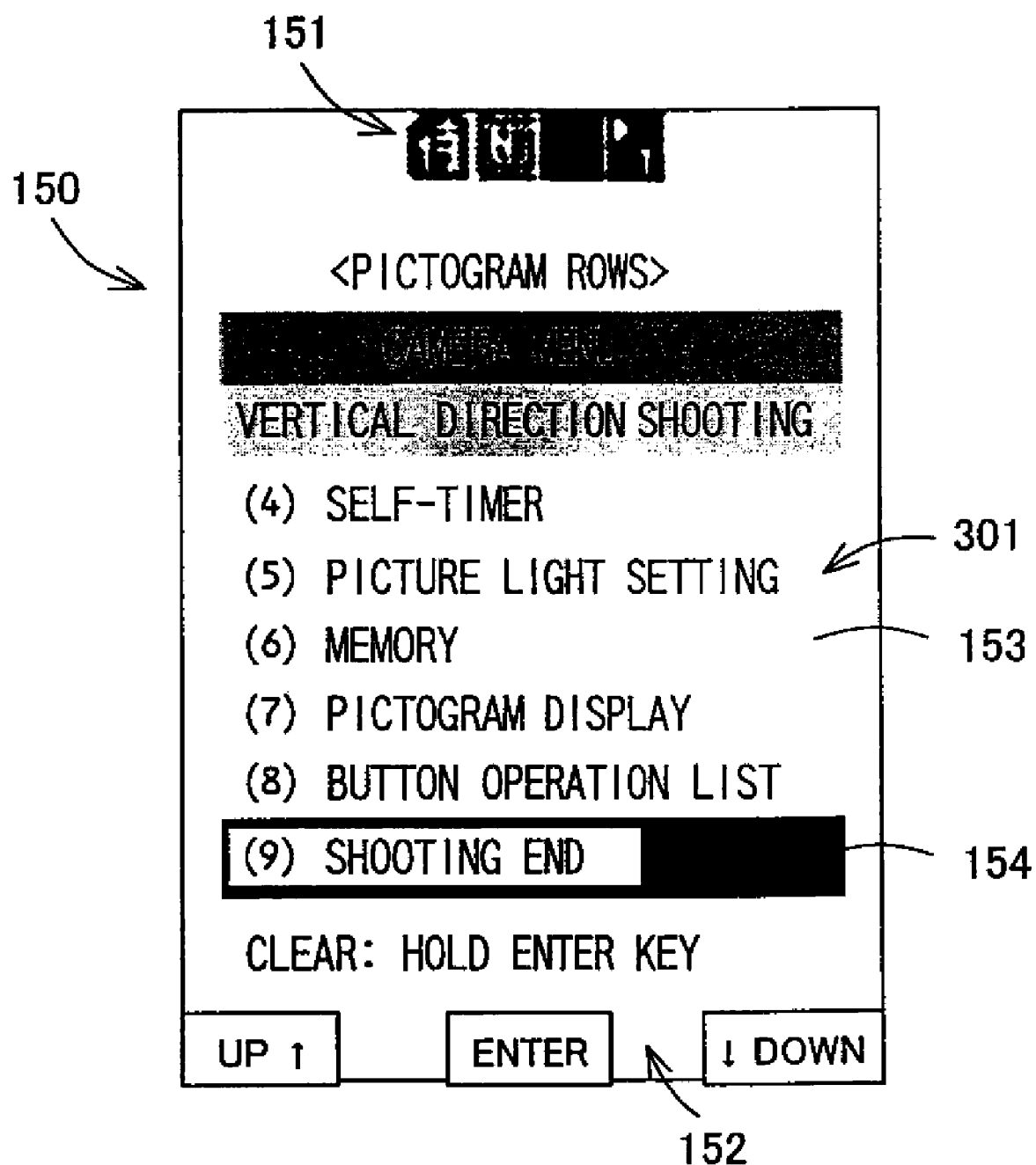
FIG. 27 shows the display screen of the outer display with a sub-menu being displayed.

FIGS. 26 and 27 show the display screen 150 of the outer display 16 with a sub-menu 301 being displayed. The sub-menu 301 is displayed in the shot image display area 153 of the display screen 150. The sub-menu 301 includes a plurality of items. The plurality of items are function setting buttons for setting desired functions from among the plurality of functions related to photographing. The plurality of functions are arranged in order in a vertical direction on the display screen as a default, in other words a direction from the hinge 23 to the free end 24 of the first movable part 12.

In the operation key description area 152 are displayed the characters "UP", "DOWN" and "ENTER". The "UP" is displayed in close proximity to the LEFT key 109b. "DOWN" is displayed in close proximity to the RIGHT key 109c. "ENTER" is displayed in close proximity to the CENTER key 109a. In this way, corresponding characters are displayed in the display area of the outer display 16 in close proximity to each key. Thus the operator can operate a desired key while checking the characters displayed.

Execution then proceeds to step a72. The controller 31 determines whether the portable information processing apparatus 100 is in a closed condition based on the state of the condition detecting switch 39. In case it is determined that the portable information processing apparatus 100 is not in a closed condition, execution proceeds to step the photographing main menu in step a44 in the flowchart shown in FIG. 19. In case it is determined that the portable information processing apparatus 100 is in a closed condition, execution proceeds to step a73. The controller 31 chooses a desired item from among the plurality of items. Any one of the plurality of items is highlighted by a cursor 157 for discrimination from other items. This allows the operator to understand the target item among the plurality of items.

The controller 31, in response to command information input by way of operation of the LEFT key 109b or RIGHT key 109c, moves the cursor 157. As shown in FIG. 26 and FIG. 27, all of the plurality of items of the sub-menu 301 cannot be displayed on the display screen 150 at one time in this embodiment. However, by moving the cursor 157, it is possible to display, on the display screen 150 shown in FIG. 27, the items not found on the display screen 150 shown in FIG. 26.

In this embodiment, the plurality of items include: (1) Finder Direction; (2) Shooting Mode; (3) Continuous Shooting; (4) Self-timer; (5) Picture Light Setting; (6) Memory; (7) Pictogram Display; (8) Button Operation List; and (9) Shooting End.

"(1) Finder Direction" is an item for setting of display in a vertical direction or a horizontal direction. A display content on a display is set in a vertical direction as a default. When the display content on the display is set in a vertical direction, the vertical direction of characters displayed on the outer display 16 coincides with the vertical direction in case a hinge 23 is assumed as top and the free end 24 of a first movable part 12 as bottom. When the display content on the display is set in a horizontal direction, the vertical direction of characters displayed on the outer display 16 coincides with the vertical direction in case one side of a first movable part 12 is assumed as top and the other side as bottom.

"(2) Shooting Mode" is an item for switchover between shooting of a still picture and shooting of a moving picture. When the shooting mode is set to a moving picture, it is possible to shoot a moving picture for a predetermined interval of time by operating the shutter button 110 or camera key 134. In case a moving picture is shot, the controller 31 uses for example the MPEG system to compress the image data obtained through the imaging section 18 and stores the resulting data as a library into a second memory 34 or detachable memory.

"(3) Continuous Shooting" is an item for choosing the number of continuous shots obtained by operating the shutter button 110. For example, in case continuous shooting is set, a single operation of the shutter button 110 can shoot a predetermined number of images. The predetermined number of continuous shots is for example six as a default.

"(4) Self-timer" is an item for turning ON/OFF the self-timer. For example, in case the self-timer is switched ON, the shutter key 110 automatically operates when a predetermined interval of time has elapsed after setting.

"(5) Picture Light Setting" is an item for causing the light-emitting section 201 to emit a light or not.

"(6) Memory" is an item for choosing the second memory 34 as a built-in memory of the portable information processing apparatus 100 or a detachable memory attached to a detachable memory connector 203 in a detachable fashion as a storage destination of the data of an image shot with the imaging section 18.

"(7) Pictogram Display" is an item for setting of whether to display a pictogram showing the condition of the portable information processing apparatus 100.

"(8) Button Operation List" is an item for choosing whether to display information on the operation of the back keys 109a, 109b, 109c.

"(9) Shooting End" is an item for choosing the end of shooting with the imaging section 18.

Next, execution proceeds to step a74. The controller 31 determines whether the operator has operated a CENTER key 109a corresponding to the ENTER key. In case the controller 31 determines that the CENTER key 109a has not been operated, execution proceeds to step a72. In case the controller 31 determines that the CENTER key 109a has been operated, execution proceeds to step a75. Here, the controller 31 determines whether the CENTER key 109a has been released. In case the controller 31 determines that the CENTER key 109a has been released in step a75, execution proceeds to step a76.

In step a76, the controller 31 determines whether the item "(9) Shooting End" is chosen in step a73. In case the controller 31 determines that the item "(9) Shooting End" is chosen in step a76, execution proceeds to step a12 in the flowchart shown in FIG. 17. In case the controller 31 determines that the item "(9) Shooting End" is not chosen in step a76, execution proceeds to step a77, where setting of the item chosen in step a76 is modified. As mentioned earlier, the controller 31 has a setting information storage section 204 implemented for example by a nonvolatile storage medium such as a flash memory. In step a77, the controller 31 stores the setting information into the setting information storage section 204. In this way, the setting information is stored so that it is not necessary to modify setting information each time photographing takes place, thereby enhancing the convenience.

In case "(1) Finder Direction" is chosen in step a73, a horizontal direction is set when the display is in a vertical direction and a vertical direction is set when the display is in a horizontal direction in step a77.

Figure 28:
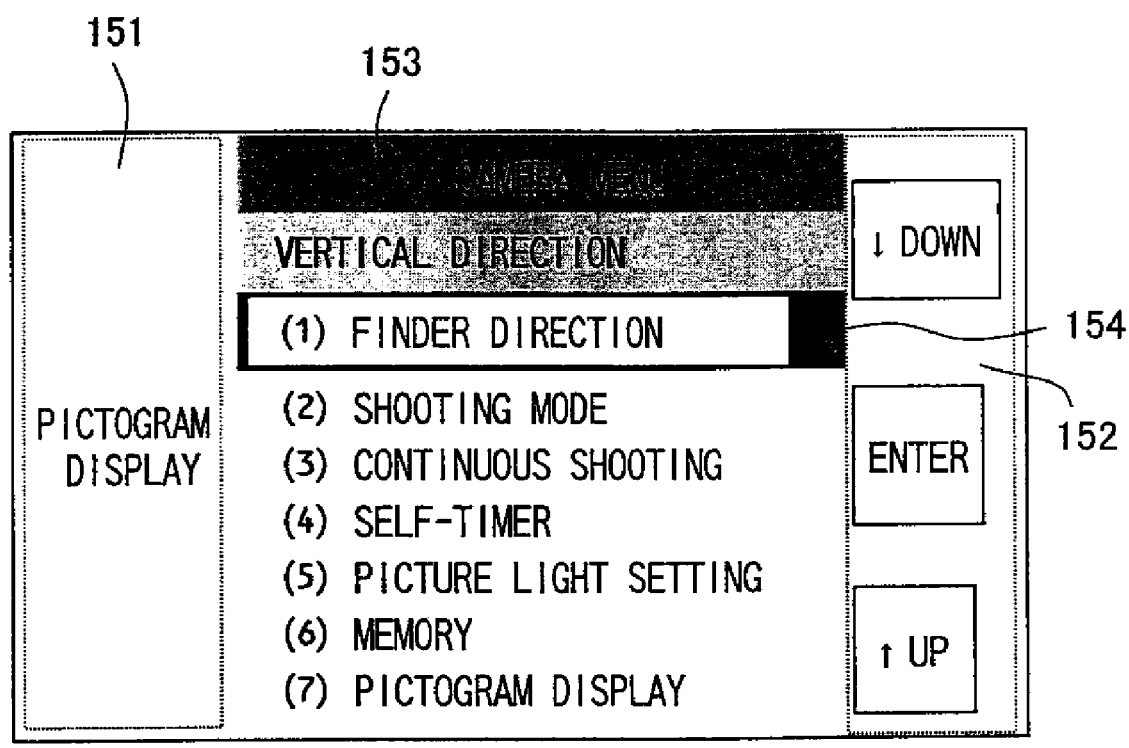
FIG. 28 shows the display screen of the outer display assumed after switchover of display screens.
Figure 29:
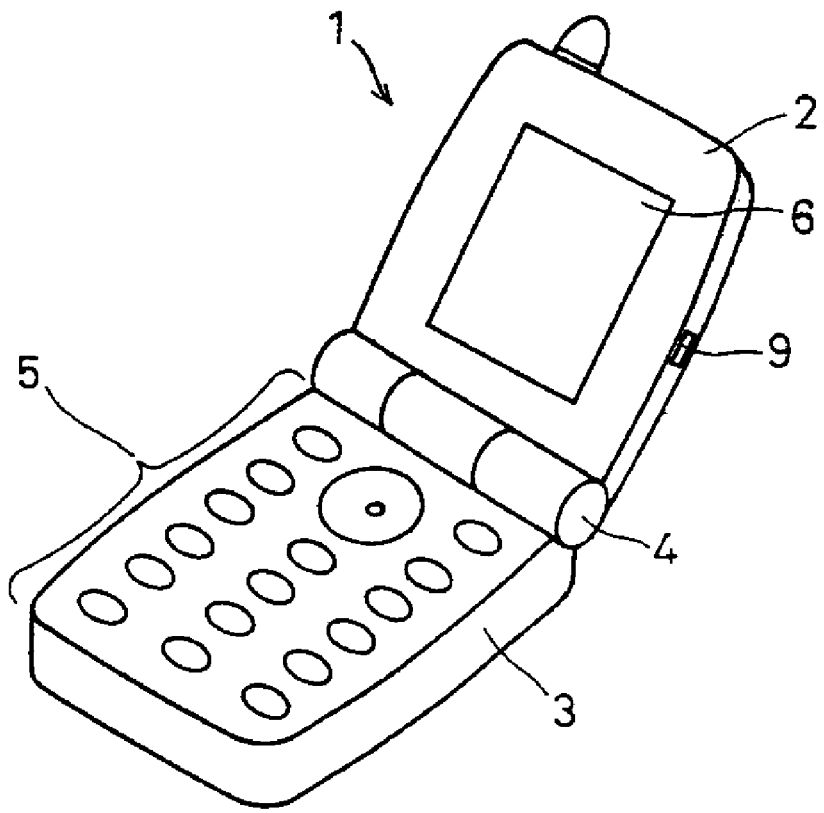
FIG. 29 is a perspective view of a cellular telephone as portable information processing apparatus according to the related art viewed from one side.
Figure 30:
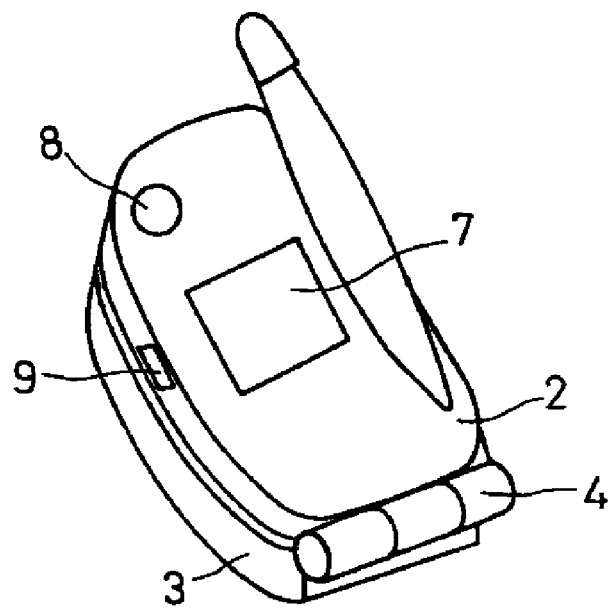
FIG. 30 is a perspective view of the cellular telephone viewed from the other side.

FIG. 28 shows the display screen 150 of the outer display 16 assumed after setting of display is modified. For example, in case setting of display is modified in step a77, display shifts from the display in FIG. 26 to that in FIG. 28. The display is maintained even in a camera mode. Thus setting of display can be modified, which enhances the freedom in photographing.

In case "(2) Shooting Mode" is chosen in step a73, the shooting mode is set to the moving picture in case the shooting mode is the still picture and to the still picture in case the shooting mode is the moving picture in step a77.

In case "(3) Continuous Shooting" is chosen in step a73, a predetermined number of continuous shots is set in case the number of continuous shots is one and the number of continuous shots is set to one in case a predetermined number of continuous shots is set.

In case "(4) Self-timer" is chosen in step a73, the self-timer is switched OFF in case it is set to ON and the self-timer is switched ON in case it is set to OFF in step a77.

In case "(5) Picture Light Setting" is chosen in step a74, the light-emitting section 201 is switched OFF in case it is set to ON and the light-emitting section 201 is switched ON in case it is set to OFF in step a77. This turns ON/OFF the light-emitting section 201.

In case "(6) Memory" is chosen in step a74, setting is made to store the image data generated with the imaging section 18 into a detachable memory in case setting is made to store the data into a second memory 34 and setting is made to store the image data generated with the imaging section 18 into the second memory 34 in case setting is made to store the data into the detachable memory in step a77.

In case "(7) Pictogram Display" is chosen in step a74, setting is made to inhibit the display of the pictogram in case the pictogram is displayed and setting is made to allow the display of the pictogram in case the pictogram is not displayed in step a77.

In case "(8) Button Operation List" is chosen in step a74, information on the description of button operation is displayed in case the information is not displayed in step a77.

When the processing in step a77 is complete, execution proceeds to step a78 and the subroutine is terminated, then execution proceeds to step a1 in the flowchart shown in FIG. 1. In case the processor 31 determines that the CENTER key 109a has not been released in step a75, execution proceeds to step a79. The controller 31 determines whether a predetermined interval of time (for example about five seconds) has elapsed in step a79. In case the controller 31 determines that the predetermined interval of time has not elapsed, execution proceeds to step a75. In case the controller 31 determines that the predetermined interval of time has elapsed in step a79, execution proceeds to step a78, where the subroutine is terminated and execution proceeds to step a1 in the flowchart shown in FIG. 1.

Figure 22:
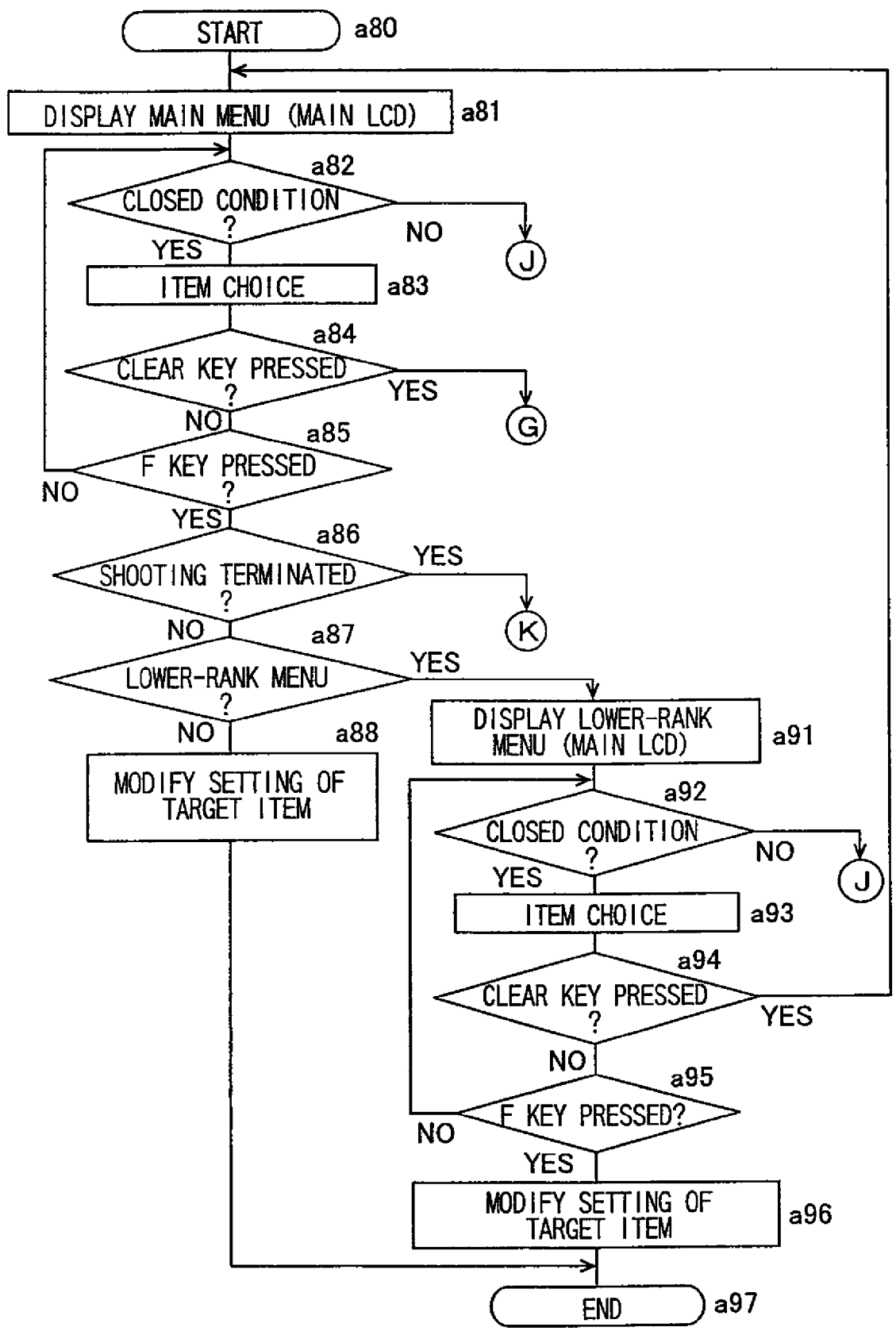
FIG. 22 is a flowchart showing the operation on photographing of the portable information processing apparatus.

FIG. 22 is a flowchart showing the subroutine of the photographing main menu. When execution proceeds to a photographing main menu in step a44 in the flowchart shown in FIG. 19, execution proceeds from step a80 to step a81 shown in FIG. 22. In step a81, the controller 31 displays a main menu on the inner display 15. The main menu is similar to the sub-menu 301.

Execution then proceeds to step a82. The controller 31 determines whether the portable information processing apparatus 100 is in a closed condition based on the state of a condition detecting switch 39. In case it is determined that the portable information processing apparatus 100 is in a closed condition, execution proceeds to the photographing sub-menu in step a10 in the flowchart shown in FIG. 17. In step a82, in case it is determined that the portable information processing apparatus 100 is not in a closed condition, execution proceeds to step a83. In step a83, the controller 31 chooses a desired item from among the plurality of items included in the main menu based on command information input from the inner operation section 14.

As is the case with the items displayed on the outer display 16, the plurality of items displayed on the inner display 15 include: (1) Finder Direction; (2) Shooting Mode; (3) Continuous Shooting; (4) Self-timer; (5) Picture Light Setting; (6) Memory; (7) Pictogram Display; (8) Button Operation List; and (9) Shooting End.

Execution then proceeds to step a84. The controller 31 determines whether the operator has operated a clear key 136 included in the operation key 14a. In case the controller 31 determines that the clear key 136 has been operated, execution proceeds to step a1 in the flowchart shown in FIG. 17. The controller 31 places the portable information processing apparatus 100 into a camera mode or shooting mode. In case the controller 31 determines that the clear key 136 has not been operated in step a84, execution proceeds to step a85. In step a85, the controller 31 determines whether the operator has operated the F key 131.

In case the controller 31 determines that the F key 131 has not been operated in step a85, execution proceeds to step a82. In case the controller 31 determines that the F key 131 has been operated, execution proceeds to step a86. In step a86, the controller 31 determines whether "(9) Shooting End" is chosen in item choice in step a83, In case the controller 31 determines that "(9) Shooting End" is chosen in step a86, execution proceeds to step a97 then step a46 in the flowchart shown in FIG. 19.

In case the controller 31 determines that "(9) Shooting End" is not chosen in step a86, execution proceeds to step a87. In step a87, the controller 31 determines whether a lower-rank menu is present. The lower-rank menu includes a plurality of items for detailed setting of functions corresponding to the items of the main menu.

In case the controller 31 determines that a lower-rank menu is not present in step a87, execution proceeds to step a88. Setting of functions corresponding to the items chosen in step a83 is modified. Execution then proceeds to step a1 in the flowchart shown in FIG. 17.

In case the controller 31 determines that a lower-rank menu is present in the step a87, execution proceeds to step a91. The lower-rank menu is displayed on the inner display 15. As a lower-rank menu, the controller 31 displays choice buttons for making detailed setting of the functions. For example, in the lower-rank menu of "(3) Continuous Shooting", the number of continuous shots is displayed. That is, for example, function display buttons corresponding to the number of continuous shots such as two, nine and 25 are displayed. For example, in the lower-rank menu of "(4) Self-timer", the timer duration is displayed. That is, for example, function display buttons corresponding to the timer durations such as five seconds, 10 seconds and 15 seconds are displayed.

Execution then proceeds to step a92. In step a92, the controller 31 determines whether the portable information processing apparatus 100 is in a closed condition based on the state of the condition detecting switch 39. In case it is determined that the portable information processing apparatus 100 is in a closed condition, execution proceeds to the photographing sub-menu in step a10 shown in FIG. 17. In case it is determined that the portable information processing apparatus 100 is not in a closed condition in step a92, execution proceeds to step a93, where the controller 31 chooses a desired item from among the plurality of items based on command information input from the outer operation section 17.

Execution then proceeds to step a94. The controller 31 determines whether the operator has operated a clear key 136 included in the operation key 14a. In case the controller 31 determines that the clear key 136 has been operated, execution proceeds to step a81. In case the controller 31 determines that the clear key 136 has not been operated in step a94, execution proceeds to step a95. In step a95, the controller 31 determines whether the operator has operated the F key 131.

In case the controller 31 determines that the F key 131 has not been operated in step a95, execution proceeds to step a92. In case the controller 31 determines that the F key 131 has been operated, execution proceeds to step a96. In step a96, setting of functions corresponding to the items chosen in step a93 is modified. In this way, the controller 31 can modify the detailed setting of the functions set with function choice buttons displayed on the outer display 16, by way of function display buttons displayed on the inner display 15. The setting information modified is stored into the setting information storage section 204. Execution then proceeds to step a97 and to step a1 in the flowchart shown in FIG. 17.

Table 1 shows the commands corresponding to operation keys in the outer operation section 17 in each of the conditions: a condition where an image shot with the imaging section 18 in the camera mode is displayed on the outer display 16; a condition where the sub-menu 301 is displayed on the outer display 16; and a condition of preview after photographing, that is, a temporarily stored image is displayed on the outer display 16.

tion of the apparatus is simplified and the number of parts is reduced to facilitate assembling of the apparatus.

The controller 31 displays items on the outer display 16 in a state where settable function are restricted in comparison with items displayed on the inner display 15. For detailed setting, a plurality of function display buttons on the inner display 15 are used. For simple setting, a plurality of function display buttons on the outer display 16 are used.

Thus, in case detailed setting is not made, setting is available with the enclosure of the portable information processing apparatus 100 in a closed condition. It is not necessary to place the enclosure into an open condition from a closed condition, which simplifies the operation procedure as well as reduces the setting time. Setting is made using the outer

TABLE 1

| State | LEFT key | LEFT key held down | Center key | Center key held down | RIGHT key | RIGHT key held down | Shutter key pressed halfway | Shutter key pressed all the way in |
|---|---|---|---|---|---|---|---|---|
| Photographing in camera mode | Zoom down | Zoom down (continuous) | Menu display | Standby screen display | Zoom up | Zoom up (continuous) | Focus lock | Photographing |
| Menu display | Upward travel of cursor | — | ENTER | Return to previous screen | Downward travel of cursor | — | — | — |
| Preview display after photographing | main transmission | — | Storage | Standby screen display | Screen setting menu display | — | — | — |

For example, by operating the LEFT key 109b in the camera mode, it is possible to supply a Zoom Down command to the controller 31.

According to the portable information processing apparatus 100, the key operation section 19 is used to choose at least part of all the shot images. In this way, it is possible to choose part of all the shot images desired by the operator, thus enhancing the freedom in photographing. According to the portable information processing apparatus 100, the outer operation section 17 includes back keys 109a, 109b, 109c as operation pieces. By way of the back keys 109a, 109b, 109c, it is possible to issue a storage command for storing an image and a standby display command for setting a shot image as a standby display screen almost as the same time. By using the back keys 109a, 109b, 109c, it does not need to separately issue a storage command and a standby display command. This simplifies the setting of the standby display screen.

While the three back keys 109a, 109b, 109c are arranged at arbitrary intervals, other configuration are also available. One of the three back keys 109a, 109b, 109c may be arranged in close proximity to one side of a rectangular display area and another back key may be arranged in close proximity to another side adjacent to the one side of a rectangular display area. By increasing the intervals between the back keys 109a, 109b, 109c, undesirable operation of other back keys can be avoided. In another embodiment of the invention, an item in a lower-rank menu may include a lower-rank menu.

According to this embodiment, it is possible to use the function setting operation buttons formed by way of hardware such as the inner operation section 14 and the outer operation section 17 to choose function display buttons displayed on the inner display 15 and the outer display 16 and formed by way of software and to set functions corresponding to the function display buttons. This approach reduces the number of function setting operation buttons. Thus the hardware configuradisplay 16 whose display face is smaller than that of the inner display 15, thereby promptly reducing the power consumption of the portable information processing apparatus 100. Thus it is possible to drive the portable information processing apparatus 100 for a longer interval of time by using power such as a battery to feed power to each section of the portable information processing apparatus 100. The controller 31 may display a limited number of target function display buttons on the outer display 16, compared with the inner display 15.

While the operation key description area 152 is provided in the display screen 150 in this embodiment as shown in FIG. 23, the operation key description area 152 may not be provided in another embodiment of the invention. In this case, the size of the operation key description area 153 may be enlarged and the operator can check a shot image with ease.

While image data is converted to JPEG data in this embodiment, it is not limited thereto, the image data may be converted to for example PNG (Portable Network Graphics) data also. Various partial modifications may be made to the foregoing embodiments without departing from the spirit and scope of the claims of the invention.

While a cellular telephone is described as an example of portable information processing apparatus in the foregoing embodiments of the invention, the portable information processing apparatus may be for example a laptop personal computer or a Personal Digital Assistant (PDA).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A portable information processing apparatus comprising:
   a first movable part;
   a second movable part, the first movable part and the second movable part being connected so as to be mutually angularly displaceable, from a closed condition where the movable parts are opposed to each other to an open condition where areas of the first and second movable parts opposed in the closed condition are exposed to the outside;
   an inner operation section for entering predetermined information, the inner operation section being provided in an area of the second movable part opposed to the first movable part in a closed condition where the first and second movable parts are opposed to each other;
   an inner display for displaying a predetermined display content in response to predetermined information entered from the inner operation section, the inner display being provided in an area of the first movable part opposed to the second movable part in a closed condition where the first and second movable parts are opposed to each other;
   an outer display for displaying a predetermined display content, the outer display being provided in an area exposed to the outside, of at least one of the first movable part and second movable part in a closed condition where the first and second movable parts are opposed to each other;
   an outer operation section for entering predetermined information on the predetermined display content displayed on the outer display, the outer operation section being provided in an area other than the exposed area of at least one of the first and second movable parts whichever comes behind the outer display in a closed condition where the first and second movable parts are opposed to each other;
   an externally oriented imaging section provided in the exposed area;
   a condition detector for detecting a closed condition and an open condition of the first and second movable parts; and
   a controller for causing the imaging section to shoot an image in response to predetermined information entered from one of the inner operation section and the outer operation section, causing the inner display to display the image shot by the imaging section when the predetermined information was entered from the inner operation section, and causing the outer display to display the image shot by the imaging section when the predetermined information was entered from the outer operation section.

2. A portable information processing apparatus comprising:
   a first movable part;
   a second movable part, the first movable part and the second movable part being connected so as to be mutually angularly displaceable, from a closed condition where the movable parts are opposed to each other to an open condition where areas of the first and second movable parts opposed in the closed condition are exposed to the outside;
   an inner operation section for entering predetermined information, the inner operation section being provided in an area of the second movable part opposed to the first movable part in a closed condition where the first and second movable parts are opposed to each other;
   an inner display for displaying a predetermined display content in response to predetermined information entered from the inner operation section, the inner display being provided in an area of the first movable part opposed to the second movable part in a closed condition where the first and second movable parts are opposed to each other;
   an outer display for displaying a predetermined display content, the outer display being provided in an area exposed to the outside, of at least one of the first movable part and second movable part in a closed condition where the first and second movable parts are opposed to each other;
   an outer operation section for entering predetermined information on the predetermined display content displayed on the outer display, the outer operation section being provided in an area other than the exposed area of at least one of the first and second movable parts whichever comes behind the outer display in a closed condition where the first and second movable parts are opposed to each other;
   a condition detector for detecting a closed condition and an open condition of the first and second movable parts; and
   an imaging section disposed on the exposed area, for shooting an image in response to predetermined information entered from one of the inner operation section and the outer operation section, the imaging section being provided facing the same side as the side where the display face of the outer display faces,
   wherein an image shot with the imaging section is displayed on the inner display when the predetermined information used to shoot an image with the imaging section was entered from the inner operation section, and is displayed on the outer display when the predetermined information used to shoot an image with the imaging section was entered from the outer operation section.

3. The portable information processing apparatus of claim 1 or 2, wherein at least one of the inner operation section and the outer operation section includes an operation selector for activating one of the inner operation section and the outer operation section and deactivating the other one of the inner operation section and the outer operation section.

4. The portable information processing apparatus of claim 1, wherein the controller sets the outer operation section to a command input function capable of inputting a command related to photographing, while displaying the image shot by the imaging section on the outer display.

5. The portable information processing apparatus of claim 1, wherein the controller displays a plurality of function display buttons for setting a desired function selected from among a plurality of functions related to photographing on one of the inner display and the outer display, and
   a plurality of function setting operation buttons corresponding to the plurality of function display buttons are respectively provided in the inner operation section and the outer operation section.

6. The portable information processing apparatus of claim 4, wherein the controller displays a plurality of function display buttons for setting a desired function selected from among a plurality of functions related to photographing on one of the inner display and the outer display, and
   a plurality of function setting operation buttons corresponding to the plurality of function display buttons are respectively provided in the inner operation section and the outer operation section.

7. The portable information processing apparatus of claim 5, wherein the controller displays the function setting display buttons on the outer display in a state where settable functions are restricted in comparison with the plurality of function display buttons displayed on the inner display.

8. The portable information processing apparatus of claim 5, further comprising:
a setting information storage section for storing information set with the function setting operation button.

9. The portable information processing apparatus of claim 7, further comprising:
a setting information storage section for storing information set with the function setting operation button.

10. The portable information processing apparatus of claim 1 or 2, wherein the controller is adapted to cause the outer display to display the image shot by the imaging section and a content showing a setting on the photographing.

11. The portable information processing apparatus of claim 10, wherein the outer operation section is provided with an operation key for entering information concerning setting on photographing.

12. The portable information processing apparatus of claim 11, wherein the outer operation section has operation keys including at least an UP key, a DOWN key, a LEFT key and a RIGHT key, and
the controller is adapted to modify exposure correction setting or ZOOM/WIDE setting when the UP key or the DOWN key, or the LEFT key or the RIGHT key is pressed while displaying the image shot by the imaging section on the outer display.

13. The portable information processing apparatus of claim 10, wherein the controller is adapted to cause an end of the outer display to display a content showing setting on photographing.

14. The portable information processing apparatus of claim 1 or 2, wherein the controller is adapted to cause the inner display to display the image shot by the imaging section and a content showing setting on photographing.

15. The portable information processing apparatus of claim 14, wherein the inner operation section is provided with an operation key for entering information concerning setting on photographing.

16. The portable information processing apparatus of claim 1 or 2, wherein the controller is adapted to cause the outer display to display a function menu screen so that function setting items related to photographing can be displayed thereon and each of the items can be chosen by the outer operation section.

17. The portable information processing apparatus of claim 16, wherein the outer operation section has at least a key for causing the outer display to display the function menu screen.

18. The portable information processing apparatus of claim 17, wherein the controller is adapted to cause the outer display to display the function menu screen when the key is operated while the controller is causing the outer display to display the image shot by the imaging section.

19. The portable information processing apparatus of claim 16, wherein the outer operation section has at least an UP key and a DOWN key, and
the controller is adapted to move a cursor displayed on the function menu screen to choose an item by pressing at least one of the UP key and the DOWN key.

20. The portable information processing apparatus of claim 19, wherein the outer operation section further has a CENTER key, and
the controller is adapted to validate or cancel an item chosen with the cursor by pressing the CENTER key.

21. The portable information processing apparatus of claim 1 or 2, wherein the outer operation section is provided with an operation key for entering information concerning a setting on photographing, and
the operation key has at least an UP key, a DOWN key, a LEFT key and a RIGHT key.

22. The portable information processing apparatus of claim 21, wherein the controller is adapted to modify exposure correction setting or ZOOM/WIDE setting when one of the UP key and the DOWN key or one of the LEFT key and the RIGHT key is pressed while displaying the image shot by the imaging section on the outer display.

23. The portable information processing apparatus of claim 21, further comprising:
a memory for storing image data, wherein
the outer operation section has a CENTER key arranged in a center of the UP key, DOWN key, LEFT key and RIGHT key, and
the controller is adapted to cause the memory to store the image data of the image shot by the imaging section when the CENTER key is pressed while the controller is causing the outer display to display the image shot by the imaging section.

24. The portable information processing apparatus of claim 21, wherein the outer operation section is provided to face a side the same as a side which the display face of the outer display faces.

25. A portable information processing apparatus comprising:
a first movable part;
a second movable part, the first movable part and the second movable part being connected so as to be mutually angularly displaceable, from a closed condition where the movable parts are opposed to each other to an open condition where areas of the first and second movable parts opposed in the closed condition are exposed to the outside;
an inner operation section for entering predetermined information, the inner operation section being provided in an area of the second movable part opposed to the first movable part in a closed condition where the first and second movable parts are opposed to each other;
an inner display for displaying a predetermined display content in response to predetermined information entered from the inner operation section, the inner display being provided in an area of the first movable part opposed to the second movable part in a closed condition where the first and second movable parts are opposed to each other;
an outer display for displaying a predetermined display content, the outer display being provided in an area exposed to the outside, of at least one of the first movable part and second movable part in a closed condition where the first and second movable parts are opposed to each other;
an outer operation section for entering predetermined information on the predetermined display content displayed on the outer display, the outer operation section being provided in an area other than the exposed area of at least one of the first and second movable parts whichever comes behind the outer display in a closed condition where the first and second movable parts are opposed to each other;
a condition detector for detecting a closed condition and an open condition of the first and second movable parts; and
an operation selector key for activating one of the inner operation section and the outer operation section and deactivating the other one of the inner operation section and the outer operation section.

26. The portable information processing apparatus of claim 25, wherein the operation selector key activates the outer operation section and deactivates the inner operation section.

27. The portable information processing apparatus of claim 25, wherein by validating an input from the inner operation section, the inner operation section is activated, and by validating an input from the outer operation section, the outer operation section is activated, and the operation selector key is adapted to modify a setting on whether the input from the inner operation section or the input from the outer operation section is validated.

28. The portable information processing apparatus of claim 25, wherein the operation selector key is provided in at least one of the inner operation section and the outer operation section.

29. The portable information processing apparatus of claim 25, further comprising:

a controller, wherein by validating an input from the inner operation section, the inner operation section is activated, and by validating an input from the outer operation section, the outer operation section is activated, and the controller is adapted to modify a setting on whether the input from the inner operation section or the input from the outer operation section is validated when the operation selector key is operated.

30. The portable information processing apparatus of claim 25, further comprising:

an externally oriented imaging section provided in the exposed area in the closed condition where the first and second movable parts are opposed to each other; and a controller for causing the imaging section to shoot an image in response to information entered from one of the inner operation section and the outer operation section, causing the inner display to display the image shot by the imaging section when the information for shooting by the imaging section was entered from the inner operation section, and causing the outer display to display the image shot by the imaging section when the information for shooting by the imaging section was entered from the outer operation section.

31. The portable information processing apparatus of claim 30, wherein the outer operation section and the imaging section are provided to face the same side as the side where the display face of the outer display faces in the closed condition, and the outer operation section and the imaging section are provided on opposite sides of the outer display.

32. The portable information processing apparatus of claim 30, wherein the outer operation section includes at least an operation key for causing the outer display to display a function menu screen including items for setting function related to photographing, and is provided so that each of the items of the function menu screen displayed in the outer display can be chosen by the operation key.

33. The portable information processing apparatus of claim 30, wherein the controller is adapted to cause the inner display to display the image shot by the imaging section in the open condition and switches from the inner display to the outer display to cause the outer display to display the image shot by the imaging section when switching from the open condition to the closed condition is carried out.

34. The portable information processing apparatus of claim 30, further comprising:

a memory for storing a image data, wherein the inner operation section includes an operation key intended for storage of the image data shot by the imaging section into the memory.

35. The portable information processing apparatus of claim 30, wherein the inner operation section includes a shutter key.

36. The portable information processing apparatus of claim 30, further comprising:

a memory for storing a image data, wherein the outer operation section includes an operation key intended for storage of the image data shot by the imaging section into the memory.

37. The portable information processing apparatus claim 30, wherein the outer operation section includes a shutter key.

38. The portable information processing apparatus of claim 32 or 36, wherein the outer display displays the image shot by the imaging section and a description of the operation key of the outer operation section.

39. The portable information processing apparatus of claim 38, wherein the outer operation section is provided to face a side the same as a side which the display face of the outer display faces, and an operation key description area showing the description of the operation key is provided in an end area close to the operation key in a display screen of the outer display.

40. A portable information processing apparatus comprising:

a first movable part;

a second movable part, the first movable part and the second movable part being connected so as to be mutually angularly displaceable, from a closed condition where the movable parts are opposed to each other to an open condition where areas of the first and second movable parts opposed in the closed condition are exposed to the outside;

an inner operation section for entering predetermined information, the inner operation section being provided in an area of the second movable part opposed to the first movable part in a closed condition where the first and second movable parts are opposed to each other;

an inner display for displaying a predetermined display content in response to predetermined information entered from the inner operation section, the inner display being provided in an area of the first movable part opposed to the second movable part in a closed condition where the first and second movable parts are opposed to each other;

an outer display for displaying a predetermined display content, the outer display being provided in an area exposed to the outside, of at least one of the first movable part and second movable part in a closed condition where the first and second movable parts are opposed to each other;

an outer operation section for entering predetermined information on the predetermined display content displayed on the outer display, the outer operation section being provided in an area other than the exposed area of at least one of the first and second movable parts whichever comes behind the outer display in a closed condition where the first and second movable parts are opposed to each other;

a condition detector for detecting a closed condition and an open condition of the first and second movable parts, an operation selector key for activating one of the inner operation section and the outer operation section and deactivating the other one of the inner operation section and the outer operation section;

an externally oriented imaging section provided in the exposed area in the closed condition where the first and second movable parts are opposed to each other; and a controller for causing the imaging section to shoot an image in response to information entered from one of the inner operation section and the outer operation section, causing the inner display to display the image shot by the imaging section when the information for shooting by the imaging section was entered from the inner operation section, and causing the outer display to display the image shot by the imaging section when the information for shooting by the imaging section was entered from the outer operation section, wherein the outer operation section includes at least an operation key for causing the outer display to display a function menu screen including items for setting function related to photographing, and is provided so that each of the items of the function menu screen displayed in the outer display can be chosen by the operation key, and the controller is adapted to cause the outer display to display the function menu screen when the operation key is operated while the controller is causing the outer display to display the image shot by the imaging section.

41. The portable information processing apparatus of claim 32, wherein the outer operation section has at least an UP key and a DOWN key, and the controller is adapted to move a cursor displayed on the function menu screen to choose an item by pressing at least one of the UP key and the DOWN key.

42. The portable information processing apparatus of claim 41, wherein the outer operation section further has a CENTER key, and the controller is adapted to validate or cancel an item chosen with the cursor displayed on the function menu screen by pressing the CENTER key.

43. A cellular telephone comprising the portable information processing apparatus of claim 1 or 2.

44. The portable information processing apparatus of claim 25, further comprising:

a condition detector for detecting at least the closed condition;

an externally oriented imaging section provided in the exposed area in the closed condition where the first and second movable parts are opposed to each other; and a controller for causing the imaging section to shoot an image in response to information entered from one of the inner operation section and the outer operation section, causing the inner display to display the image shot by the image section when the information for shooting by the imaging section was entered from the inner operation section, and causing the outer display to display the image shot by the image section when the information for shooting by the imaging section was entered from the outer operation section, wherein the controller is adapted to cause the outer display to display the image shot by the imaging section and a content showing a setting on a current photographing set by the outer display section when the condition detector detects the closed condition.

45. The portable information processing apparatus of claim 29, further comprising:

an externally oriented imaging section provided in the exposed area in the closed condition where the first and second movable parts are opposed to each other, wherein the controller is adapted to cause the imaging section to shoot an image in response to information entered from one of the inner operation section and the outer operation section, is adapted to cause the inner display to display the image shot by the imaging section when the information for shooting by the imaging section was entered from the inner operation section, and is adapted to cause the outer display to display the image shot by the imaging section when the information for shooting by the imaging section was entered from the outer operation section, and the controller is adapted to invalidate an input of information from the inner operation section when a change from the open condition to the closed condition is detected by the condition detector and is adapted to cause the outer display to display the image shot by the imaging section and a content showing a setting on a current photographing set by the outer display section.

46. The portable information processing apparatus of claim 29, further comprising:

an externally oriented imaging section provided in the exposed area in the closed condition where the first and second movable parts are opposed to each other, wherein the controller is adapted to cause the imaging section to shoot an image in response to information entered from one of the inner operation section and the outer operation section, is adapted to cause the inner display to display the image shot by the imaging section when the information for shooting by the imaging section was entered from the inner operation section, and is adapted to cause the outer display to display the image shot by the imaging section when the information for shooting by the imaging section was entered from the outer operation section, the controller is adapted to invalidate an input of information from the outer operation section and is adapted to validate an input of information from the inner operation section when a change from the closed condition to the open condition is detected by the condition detector, and the controller is adapted to cause the outer display to display the image shot by the imaging section and a content showing a setting on a current photographing set by the outer operation section when a change from the open condition to the closed condition is detected by the condition detector.

47. A portable information processing apparatus comprising:

a first movable part;

a second movable part, the first movable part and the second movable part being connected so as to be mutually angularly displaceable, from a closed condition where the movable parts are opposed to each other to an open condition where areas of the first and second movable parts opposed in the closed condition are exposed to the outside;

an inner operation section for entering predetermined information, the inner operation section being provided in an area of the second movable part opposed to the first movable part in a closed condition where the first and second movable parts are opposed to each other;

an inner display for displaying a predetermined display content in response to predetermined information entered from the inner operation section, the inner display being provided in an area of the first movable part opposed to the second movable part in a closed condition where the first and second movable parts are opposed to each other;

an outer display for displaying a predetermined display content, the outer display being provided in an area exposed to the outside, of at least one of the first movable part and second movable part in a closed condition where the first and second movable parts are opposed to each other;

an outer operation section for entering predetermined information on the predetermined display content displayed on the outer display, the outer operation section being provided in an area other than the exposed area of at least one of the first and second movable parts whichever comes behind the outer display in a closed condition where the first and second movable parts are opposed to each other;

a condition detector for detecting a closed condition and an open condition of the first and second movable parts;

an operation selector key for activating one of the inner operation section and the outer operation section and deactivating the other one of the inner operation section and the outer operation section; and a controller, wherein the controller is adapted to modify a setting on whether the input from the inner operation section or the input from the outer operation section is validated when the operation selector key is operated, a display face of the outer display is formed smaller than a display face of the inner display, and the controller is adapted to cause the outer display to display items of a function menu screen under conditions that display of settable functions of the outer display is limited in comparison with the inner display.

48. The portable information processing apparatus of claim 29, wherein the outer display is a translucent half-reflecting liquid crystal display device, a backlight is provided on a back of the outer operation section as viewed from a display face, and when a predetermined interval of time has elapsed since the backlight was turned on, the controller turns the backlight off.

* * * * *